(12) United States Patent
Fang et al.

(10) Patent No.: US 11,269,451 B2
(45) Date of Patent: Mar. 8, 2022

(54) TOUCH PANEL, DRIVING METHOD THEREOF AND DISPLAY DEVICE

(71) Applicants: Hefei BOE Optoelectronics Technology Co., Ltd., Anhui (CN); BOE Technology Group Co., Ltd., Beijing (CN)

(72) Inventors: Zhixiang Fang, Beijing (CN); Liangliang Zheng, Beijing (CN); Guanglei Yang, Beijing (CN); Xuxu Hu, Beijing (CN); Peng Ding, Beijing (CN); Meng Wang, Beijing (CN)

(73) Assignees: Hefei BOE Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/903,531

(22) Filed: Jun. 17, 2020

(65) Prior Publication Data

US 2021/0191614 A1 Jun. 24, 2021

(30) Foreign Application Priority Data

Dec. 18, 2019 (CN) .......................... 201911309011.7

(51) Int. Cl.
*G06F 3/041* (2006.01)

(52) U.S. Cl.
CPC ...... *G06F 3/041661* (2019.05); *G06F 3/0412* (2013.01)

(58) Field of Classification Search
CPC ................. G06F 3/044; G06F 3/04162; G06F 2203/04104; G06F 3/0383; G06F 3/0442; G06F 3/0448; G06F 3/0488; G06F 1/163; G06F 1/169; G06F 3/011; G06F 3/017; G06F 3/042; G06F 3/0441; G06F 3/047; G06F 3/041
See application file for complete search history.

(56) References Cited

U.S. PATENT DOCUMENTS

| | | | | |
|---|---|---|---|---|
| 5,495,077 | A * | 2/1996 | Miller | G06F 3/041 178/18.06 |
| 10,453,379 | B2 * | 10/2019 | Nitobe | G09G 3/2092 |
| 2006/0187142 | A1 * | 8/2006 | Lesniak | G09G 5/393 345/1.1 |
| 2009/0314621 | A1 * | 12/2009 | Hotelling | G06F 3/0443 200/600 |
| 2010/0134429 | A1 * | 6/2010 | You | G06F 3/0445 345/173 |
| 2010/0253638 | A1 * | 10/2010 | Yousefpor | G06F 3/04166 345/173 |

(Continued)

*Primary Examiner* — Olga V Merkoulova
(74) *Attorney, Agent, or Firm* — Arent Fox LLP; Michael Fainberg

(57) ABSTRACT

The present disclosure discloses a touch panel, a driving method thereof and a display device. A touch signal multiplexer is adopted to load touch signals to touch signal lines, and one pad is at least correspondingly electrically connected with two touch signal lines; in addition, a load compensation circuit is set; and while the pad loads the touch signals to one of the touch signal lines electrically connected with the pad, the load compensation circuit loads compensation signals to other touch signal lines electrically connected with the pad without the loaded touch signals.

14 Claims, 17 Drawing Sheets

(56) References Cited

U.S. PATENT DOCUMENTS

| | | | | |
|---|---|---|---|---|
| 2011/0061949 A1* | 3/2011 | Krah | ............... | G06F 3/0418 |
| | | | | 178/18.06 |
| 2011/0261005 A1* | 10/2011 | Joharapurkar | ..... | H03K 17/9622 |
| | | | | 345/174 |
| 2013/0069905 A1* | 3/2013 | Krah | ............... | G06F 3/04182 |
| | | | | 345/174 |
| 2013/0335376 A1* | 12/2013 | Lee | ............... | G06F 3/04166 |
| | | | | 345/174 |
| 2014/0015788 A1* | 1/2014 | Chang | ............... | G06F 3/041 |
| | | | | 345/173 |
| 2014/0043284 A1* | 2/2014 | Park | ............... | G06F 3/04166 |
| | | | | 345/174 |
| 2015/0116261 A1* | 4/2015 | Ahn | ............... | G01R 27/2688 |
| | | | | 345/174 |
| 2016/0116997 A1* | 4/2016 | Kim | ............... | G06F 3/03545 |
| | | | | 345/174 |
| 2016/0170529 A1* | 6/2016 | Lee | ............... | G06F 3/0446 |
| | | | | 345/174 |
| 2018/0218665 A1* | 8/2018 | Nitobe | ............... | G09G 3/3688 |
| 2019/0064977 A1* | 2/2019 | Feng | ............... | G06F 3/04166 |

* cited by examiner

TOUCH PANEL, DRIVING METHOD THEREOF AND DISPLAY DEVICE

CROSS-REFERENCE TO RELATED APPLICATIONS

This application claims priority to Chinese Patent Application No. 201911309011.7, filed on Dec. 18, 2019, which is hereby incorporated by reference in its entirety.

FIELD

The present disclosure relates to the field of display technologies, in particular to a touch panel, a driving method thereof and a display device.

BACKGROUND

With the rapid development of display technologies, touch display devices have been widely used. Generally, a touch panel and a display panel in a touch display device are independently controlled by two chips. In order to improve the degree of integration of the touch display device, a touch and display driver integration (TDDI) chip comes into being. The TDDI chip integrates the functions of a touch chip and a display chip into an integrated chip (IC).

SUMMARY

An embodiment of the present disclosure provides a touch panel, a driving method thereof and a display device.

An embodiment of the present disclosure provides a touch panel, including:
  a touch area, including a plurality of touch signal lines; and
  a non-touch area surrounding the touch area; wherein the non-touch area includes:
    a touch signal multiplexer, including a plurality of selection circuits, wherein each of the selection circuits includes an input and at least two outputs, and the at least two outputs are electrically connected with the respective touch signal lines in one-to-one correspondence;
    a compensator, including a plurality of load compensation circuits in one-to-one correspondence with the selection circuits, wherein each of the load compensation circuits and its corresponding selection circuit are electrically connected with same touch signal lines; and
    a plurality of pads, electrically connected with the respective inputs of the selection circuits in one-to-one correspondence; wherein during a touch time period,
      each of the selection circuits is configured to load touch signals to the respective touch signal lines electrically connected with the selection circuit based on time division through a pad electrically connected with the selection circuit; and
      a load compensation circuit, corresponding to the selection circuit, is configured to, while the selection circuit loads the touch signals to one of the touch signal lines, load compensation signals to other of the touch signal lines.

Optionally, in a specific implementation, the touch panel provided by the embodiment of the present disclosure further includes:
  at least two first control signal lines; wherein
  each of the selection circuits further includes:
    first switching transistors in one-to-one correspondence with the touch signal lines; wherein gates of the first switching transistors are electrically connected with different first control signal lines, first terminals of the first switching transistors are electrically connected with corresponding touch signal lines in one-to-one correspondence, and second terminals of the first switching transistors are electrically connected with a same pad.

Optionally, in a specific implementation, the touch panel provided by the embodiment of the present disclosure further includes:
  at least two second control signal lines and a compensation signal line; wherein
  each of the load compensation circuits includes:
    second switching transistors in one-to-one correspondence with the touch signal lines; wherein gates of the second switching transistors are electrically connected with different second control signal lines, first terminals of the second switching transistors are electrically connected with corresponding touch signal lines in one-to-one correspondence, and second terminals of the second switching transistors are electrically connected with the compensation signal line.

Optionally, in a specific implementation, in the touch panel provided by the embodiment of the present disclosure, for the first switching transistor and the second switching transistor which are electrically connected with a same touch signal line at a same time, the second switching transistor is turned off while the first switching transistor is turned on, and the second switching transistor is turned on while the first switching transistor is off.

Optionally, in a specific implementation, in the touch panel provided by the embodiment of the present disclosure, the second terminals of all the second switching transistors are electrically connected with a same compensation signal line.

Optionally, in a specific implementation, in the touch panel provided by the embodiment of the present disclosure, the compensator is between the touch signal multiplexer and the touch area.

Optionally, in a specific implementation, the touch panel provided by the embodiment of the present disclosure further includes: a plurality of touch electrodes which are electrically connected with the touch signal lines in one-to-one correspondence; wherein each of the selection circuits is electrically connected with two touch signal lines, the load compensation circuit which corresponds to the selection circuit is electrically connected with same two touch signal lines, and two touch electrodes which are correspondingly electrically connected with the two touch signal lines are in a same row or a same column.

Optionally, in a specific implementation, the touch panel provided by the embodiment of the present disclosure further includes: a plurality of touch electrodes which are electrically connected with the touch signal lines in one-to-one correspondence; each of the selection circuits is electrically connected with three touch signal lines, the load compensation circuit which corresponds to the selection circuit is electrically connected with same three touch signal lines, and three touch electrodes which are correspondingly electrically connected with the three touch signal lines are in a same row or a same column.

Based on the same inventive concept, an embodiment of the present disclosure further provides a display device including a display panel and a touch panel which are stacked, and the touch panel is the touch panel provided by any one of the above embodiments of the present disclosure.

Optionally, in a specific implementation, in the display device provided by the embodiment of the present disclosure, a display area of the display panel includes a plurality of common electrode blocks, and the common electrode blocks are multiplexed as touch electrodes of the touch panel.

Optionally, in a specific implementation, in the display device provided by the embodiment of the present disclosure, a non-display area of the display panel includes a first driving chip and a second driving chip, one half of the serially arranged pads in all the pads are electrically connected with the first driving chip, and the other half of the serially arranged pads in all the pads are electrically connected with the second driving chip.

Based on the same inventive concept, an embodiment of the present disclosure further provides a driving method of the touch panel provided by the embodiment of the present disclosure, including:
  loading, by the selection circuit, the touch signals to the touch signal lines through the pad based on the time division during the touch time period; and
  loading, by the load compensation circuit, while the selection circuit loads the touch signals to one of the touch signal lines, the compensation signals to other of the touch signal lines.

Optionally, in a specific implementation, the driving method of the touch panel provided by the embodiment of the present disclosure further including:
  loading, by the selection circuit, the touch signals to a first touch signal line of the touch signal lines through the pad in a first time period;
  loading, by the load compensation circuit, the compensation signals to a second touch signal line of the touch signal lines through the compensation signal line in the first time period; and
  loading, by the selection circuit, the touch signals to the second touch signal line through the pad in a second time period; and
  loading, by the load compensation circuit, the compensation signals to the first touch signal line through the compensation signal line in the second time period; wherein
  the touch time period is divided into the first time period and the second time period.

Optionally, in a specific implementation, the driving method of the touch panel provided by the embodiment of the present disclosure further including:
  loading, by the selection circuit, the touch signals to a first touch signal line of the touch signal lines through the pad in a first time period;
  loading, by the load compensation circuit, the compensation signals to a second touch signal line and a third touch signal line of the touch signal lines through the compensation signal line in the first time period;
  loading, by the selection circuit, the touch signals to the second touch signal line through the pad in a second time period;
  loading, by the load compensation circuit, the compensation signals to the first touch signal line and the third touch signal line through the compensation signal line in the second time period;
  loading, by the selection circuit, the touch signals to the third touch signal line through the pad in a third time period; and
  loading, by the load compensation circuit, the compensation signals to the first touch signal line and the second touch signal line through the compensation signal line in the third time period; wherein
  the touch time period is divided into the first time period, the second time period and the third time period.

DETAILED DESCRIPTION OF THE EMBODIMENTS

In order to make the objects, the technical solutions and the advantages of the present disclosure clearer, the specific implementations of a touch panel, a driving method thereof, and a display device provided by an embodiment of the present disclosure will be described in detail below in conjunction with the drawings. It should be understood that the preferred embodiments described below are only used to illustrate and explain the present disclosure, and are not used to limit the present disclosure. Furthermore, in the case of no conflict, the embodiments in the present disclosure and the features in the embodiments can be combined mutually.

Figure 1:
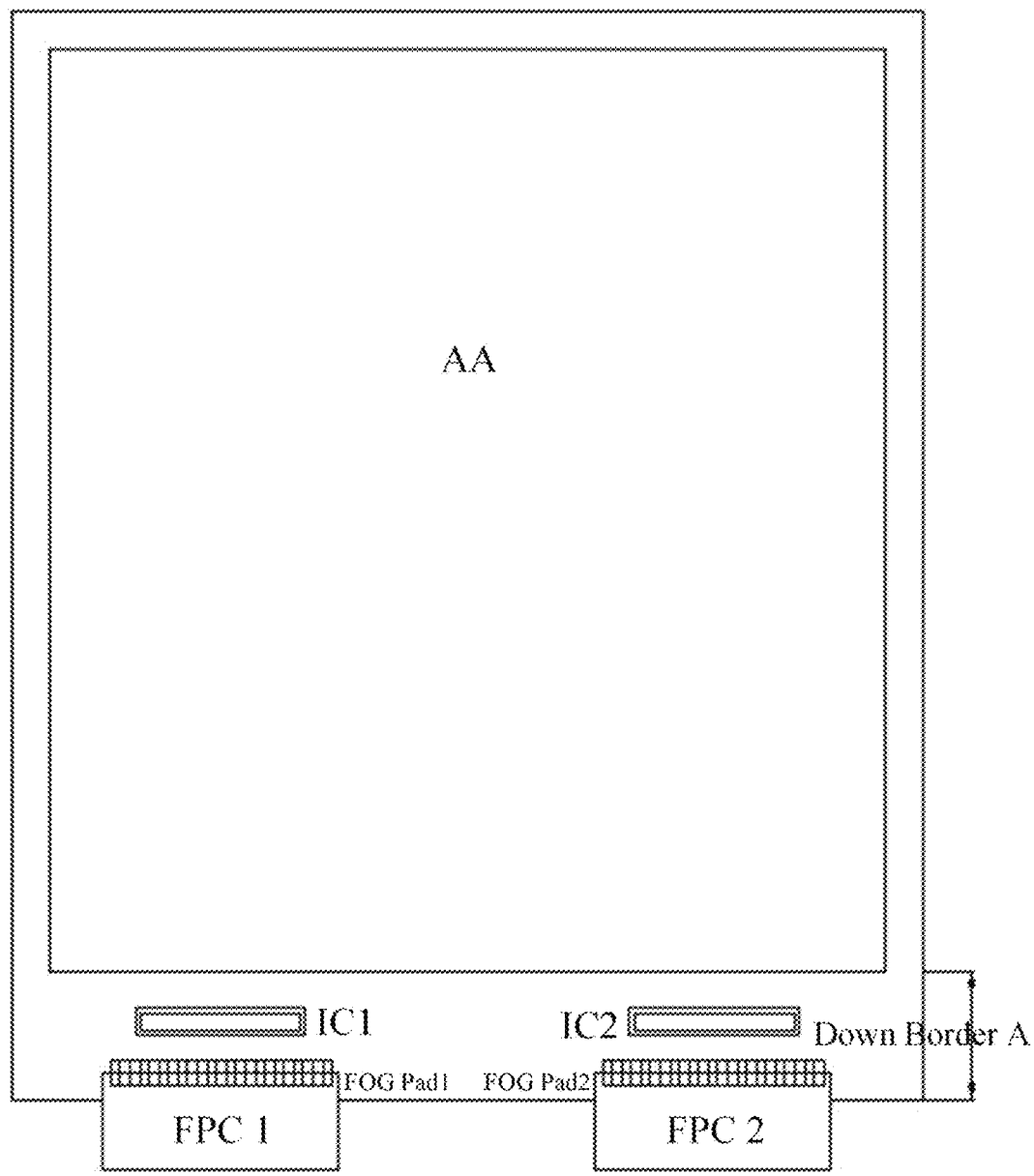
FIG. 1 is a top schematic diagram of the structure of a touch screen provided in the related art.
Figure 2:
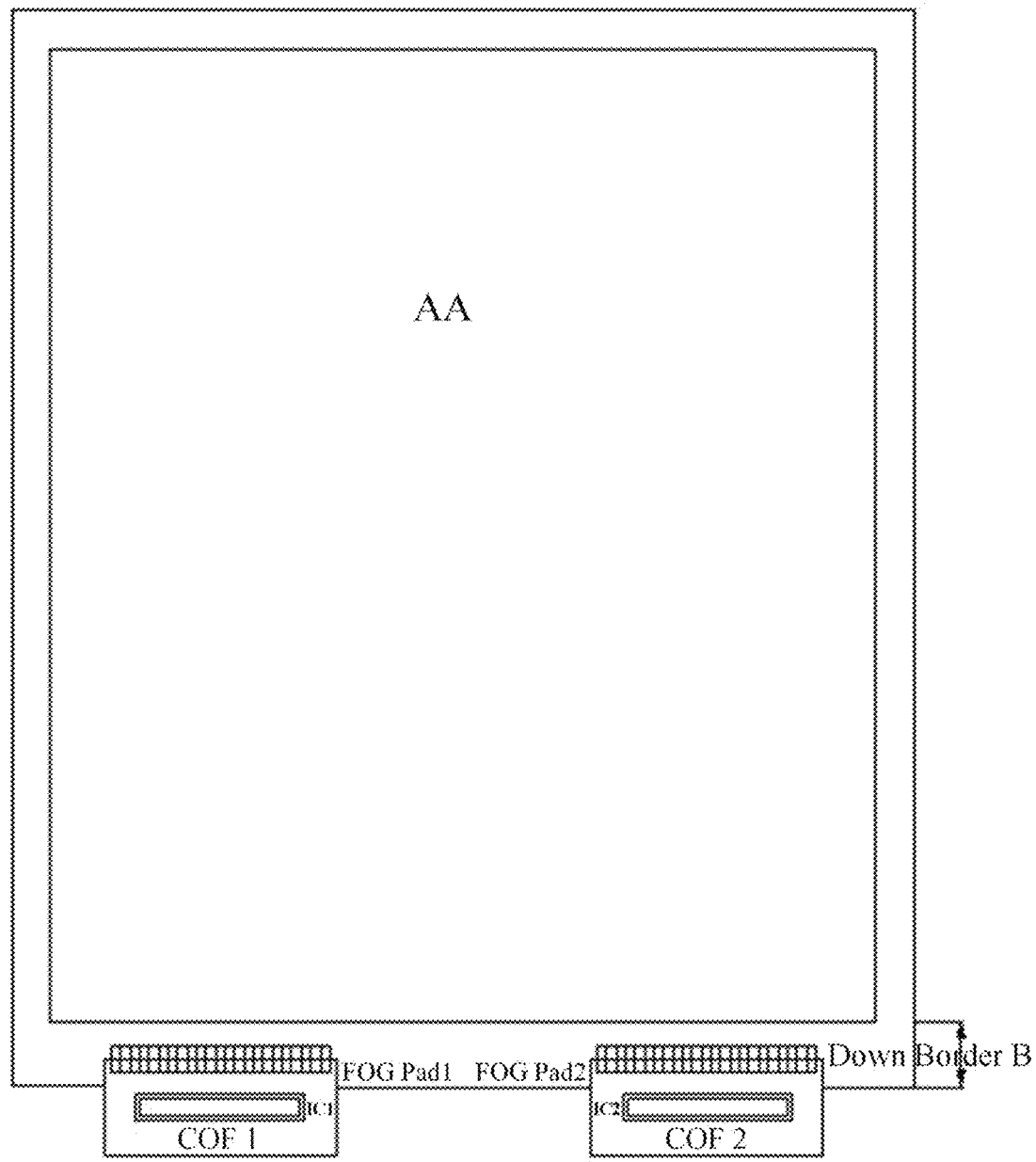
FIG. 2 is a top schematic diagram of the structure of another touch screen provided in the related art.
Figure 3:
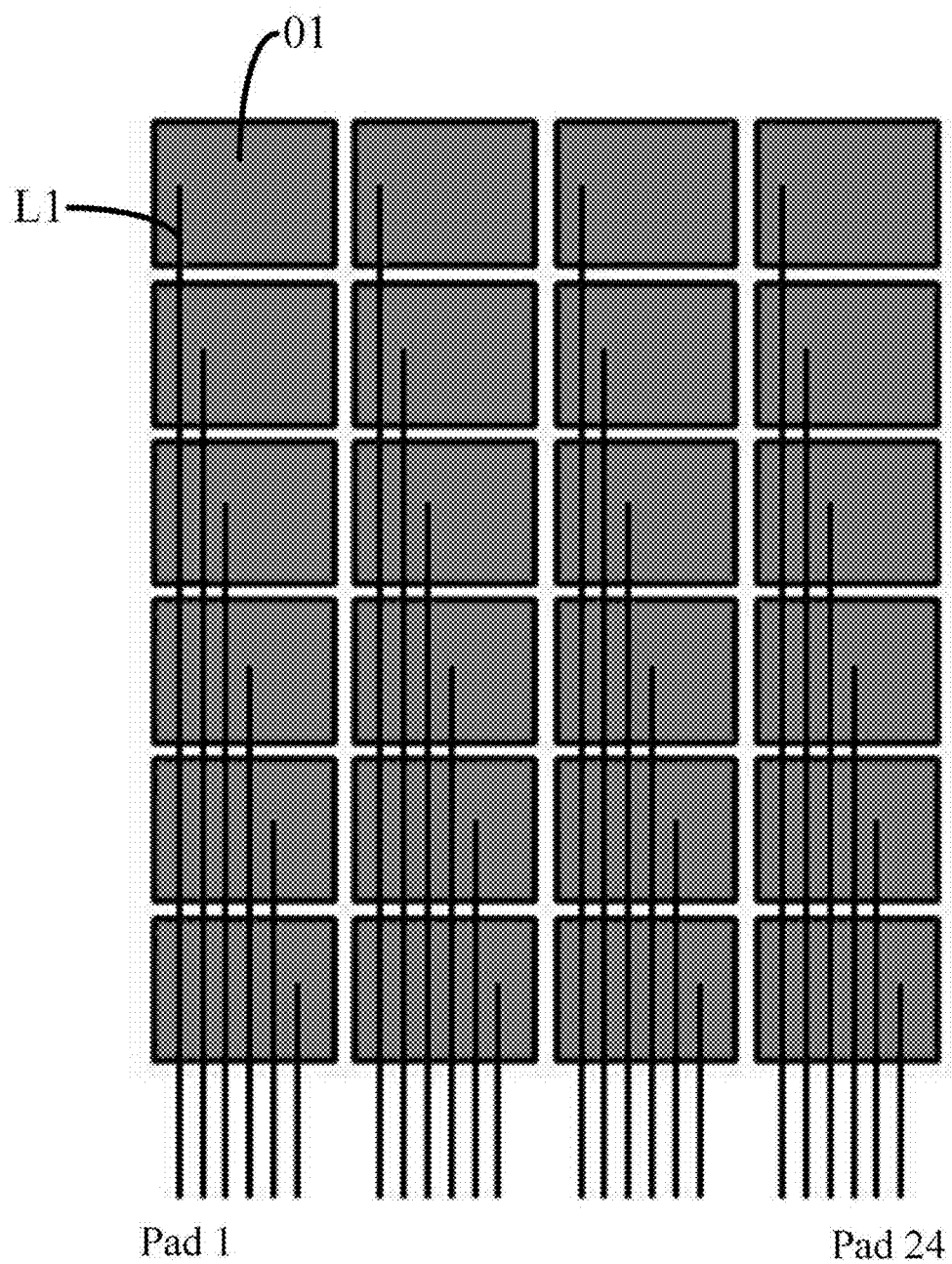
FIG. 3 is a schematic diagram illustrating the corresponding relationship between touch signal lines and pads provided in the related art.
Figure 4:
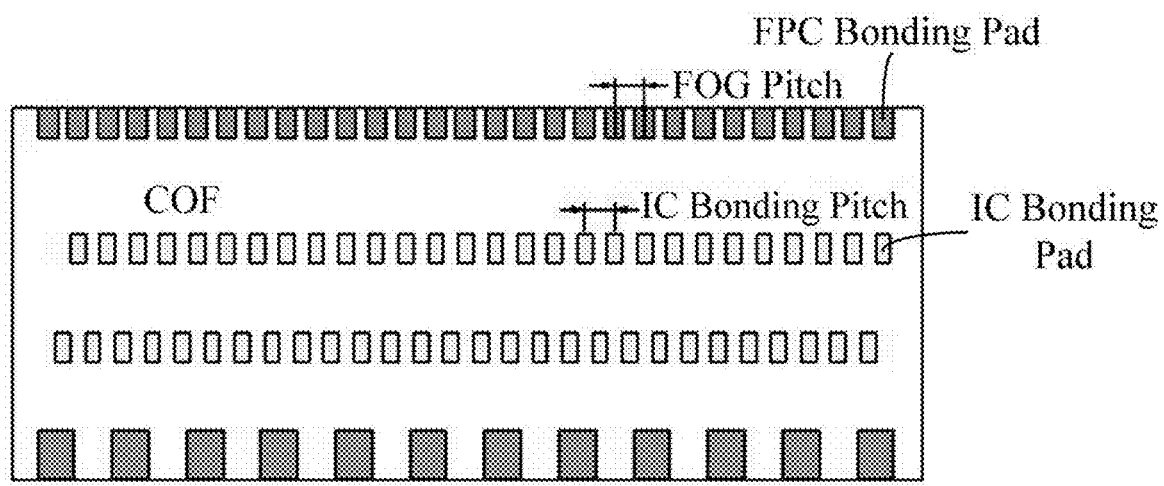
FIG. 4 is a schematic diagram of an IC bonding pad and an FPC bonding pad.

At present, based on the market technical investigation, the sizes of flat panel full-screen touch screen products in the future are mainly concentrated in medium-size to large-size. For a medium-size to large-size touch screen, two integrated circuits (ICs) and two flexible printed circuits (FPCs) are generally adopted. The touch screen product in the related art is as shown in FIG. 1, FPC 1 and FPC 2 are pressed on a glass substrate of an array substrate (namely, FPC On Glass (FOG)), and IC1 and IC2 are bonded to the glass substrate of the array substrate by an anisotropic conductive film (ACF) (namely, Chip On Glass (COG)). Due to the height of the IC and the fixed distance from the IC to an AA area required by COG Mura, a down border A is far from meeting the requirements for a full-screen border by a customer. However, considering the condition that a TDDI full-screen is the future development trend of a flat panel and the full-screen (the size of the down border) is the key bottleneck, a solution as shown in FIG. 2 is proposed, according to the solution, the way of bonding the IC on the FPC (namely, Chip On FPC (COF)) is adopted, so that the smaller lower border B is realized in comparison with the COG solution, and the full-screen may be further realized. As shown in FIG. 3, each of the touch electrodes 01 in the existing touch screen is electrically connected with one pad through the correspondingly electrically connected touch signal line L, so that the number of the pads is relatively large. For a large-size high-resolution full-screen touch screen, the number of the required pads is also relatively large. As shown in FIG. 4, due to the influence of the existing process technologies, for example, the distance between centers of FOG bonding pads, namely the bonding pitch, and the distance between centers of IC bonding pads, namely the IC bonding pitch, are limited, and the number of the effective pads which can be supported by the COF product is also limited, so that the problem of the limited number of the pads needs to be solved to realize the full-screen for the medium-size to large-size high-resolution touch screen product.

Figure 5:
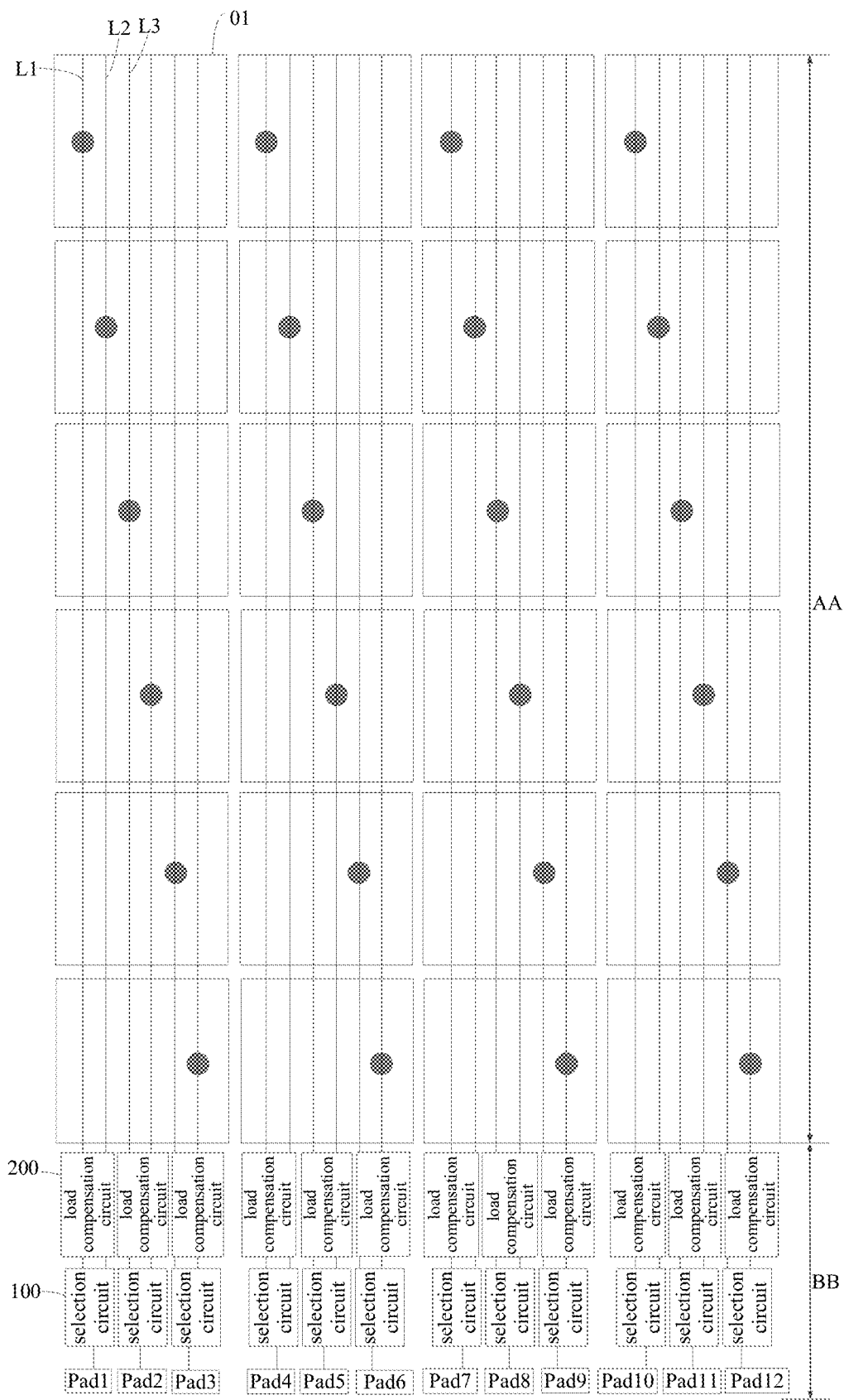
FIG. 5 is a first schematic diagram of the structure of a touch panel provided by an embodiment of the present disclosure.

In view of this, a touch panel provided by an embodiment of the present disclosure, as shown in FIG. 5, includes a touch area AA and a non-touch area BB surrounding the touch area AA; the touch area AA includes a plurality of touch signal lines (L1, L2, L3 . . . ).

The non-touch area includes: a touch signal multiplexer, a compensator and a plurality of pads (Pad 1, Pad 2, Pad 3 . . . ). The touch signal multiplexer includes a plurality of selection circuits 100. The compensator includes a plurality of load compensation circuits 200 in one-to-one correspondence with the selection circuits 100. Each selection circuit 100 includes an input and at least two outputs, the input is electrically connected with one pad, and the at least two outputs are electrically connected with at least two touch signal lines in one-to-one correspondence. FIG. 5 is an example in which each selection circuit includes two outputs, and the two outputs are electrically connected with the corresponding two touch signal lines. One load compensation circuit 200 and one selection circuit 100 which correspond to each other are electrically connected with the same touch signal lines. For example, one load compensation circuit 200 and one selection circuit 100 in the upper and lower positions on the leftmost side are correspondingly electrically connected with the touch signal line L1 and the touch signal line L2.

During a touch time period, each selection circuit 100 is configured to load touch signals to the electrically connected touch signal lines (L1 and L2) in a time division through the pad (such as Pad 1); and each load compensation circuit 200 is configured to load compensation signals to another touch signal line (such as L2) while the selection circuit 100 loads the touch signals to one of the touch signal lines (such as L1). The principle of loading the touch signals and the compensation signals will be described in detail below.

The above-mentioned touch panel provided by the embodiment of the present disclosure adopts a touch signal multiplexer to load touch signals to touch signal lines, and at least correspondingly electrically connects one pad with two touch signal lines, so that the number of the pads can be greatly reduced for the medium-size to large-size high-resolution touch screens. In addition, while the pad loads the touch signals to one of the electrically connected touch signal lines and does not load the touch signals to other electrically connected touch signal lines, a parasitic capacitance may be generated between the touch electrode which is electrically connected with the touch signal line with the loaded touch signals and the touch electrode which is electrically connected with the touch signal line without the loaded touch signals. The parasitic capacitance may cause the touch electrode with the loaded touch signals to discharge, so that the touch electrode is not fully charged. Thus, by setting the load compensation circuits in one-to-one correspondence with the selection circuits, while the pad loads the touch signals to one of the touch signal lines electrically connected with the pad, the load compensation circuit can load compensation signals to other touch signal lines electrically connected with the pad without the loaded touch signals, and then the parasitic capacitances generated between the touch electrode with the loaded touch signals and the touch electrodes without the loaded touch signals cannot affect the loading of the touch signals, so that the touch electrode is fully charged. Therefore, the above-mentioned touch panel provided by the embodiment of the present disclosure can not only solve the problem of the limited number of the pads in the existing high-resolution medium-size to large-size touch screen products, but also solve the problem of incomplete charging of the touch electrodes in the charging process.

It should be noted that the medium-size to large-size touch screen mentioned in the embodiment of the present disclosure refers to the touch screen with the size of 8 inches or more. The high resolution mentioned in the embodiment of the present disclosure refers to the resolution of 2K, 4K, 8K or even higher. For example, for the touch screen with the size of 10.1-11.1 inches, the resolution is WU (1200RGB*1920) and WQ (1600RGB*2560).

Figure 6:
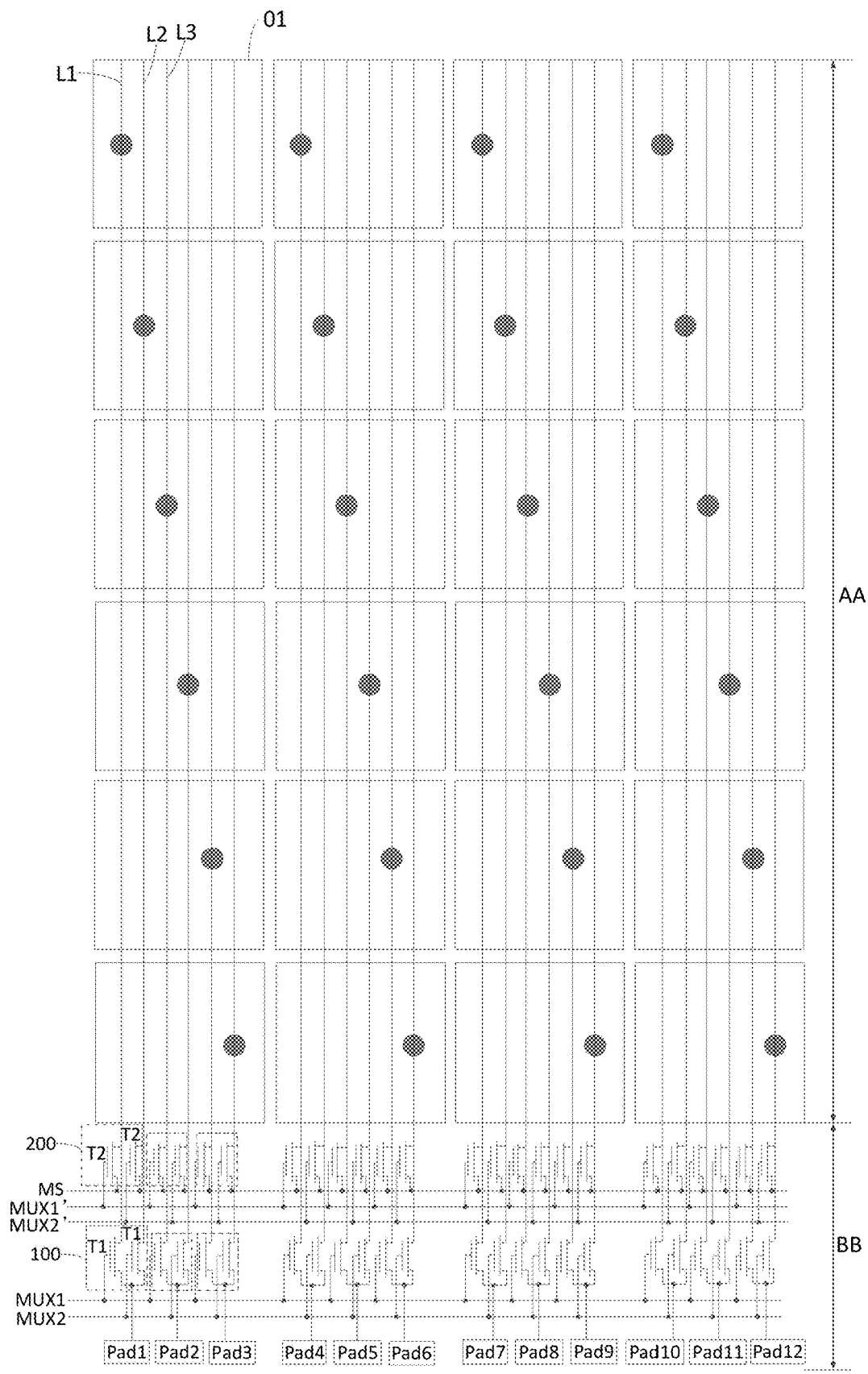
FIG. 6 is a second schematic diagram of the structure of a touch panel provided by an embodiment of the present disclosure.
Figure 7:
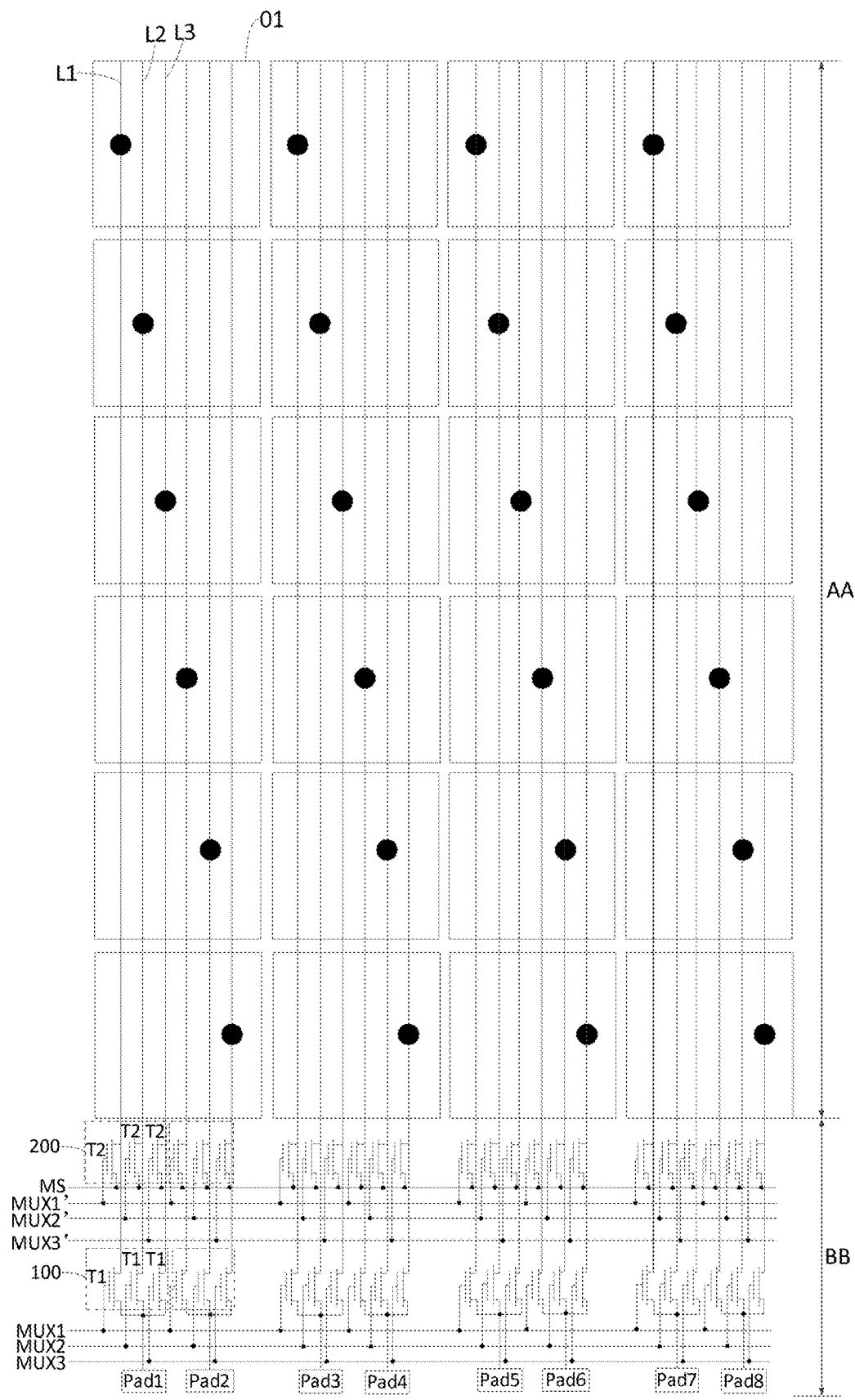
FIG. 7 is a third schematic diagram of the structure of a touch panel provided by an embodiment of the present disclosure.

In some implementations, as shown in FIGS. 6 and 7, the above-mentioned touch panel provided by the embodiment of the present disclosure further includes at least two first control signal lines. For example, the touch panel includes two first control signal lines MUX1 and MUX2 in FIG. 6, and the touch panel includes three first control signal lines, MUX1, MUX2 and MUX3) in FIG. 7. Each selection circuit 100, such as the selection circuit 100 on the leftmost side in FIGS. 6 and 7, includes: first switching transistors T1 in one-to-one correspondence with the touch signal lines electrically connected, such as the touch signal lines L1 and L2 in FIG. 6, and the touch signal lines L1, L2 and L3 in FIG. 7. Gates of the first switching transistors T1 are electrically connected with the different first control signal lines. For example, in FIG. 6, the gate of the first one of the first switching transistors T1 from the left is electrically connected with the first control signal line MUX1, and the gate of the second one of the first switching transistors T1 from the left is electrically connected with the first control signal line MUX2. For example, in FIG. 7, the gate of the first one of the first switching transistors T1 from the left is electrically connected with the first control signal line MUX1, the gate of the second one of the first switching transistors T1 from the left is electrically connected with the first control signal line MUX2, and the gate of the third one of the first switching transistors T1 from the left is electrically connected with the first control signal line MUX3). First terminals of the first switching transistors T1 are electrically connected with the corresponding touch signal lines in one-to-one correspondence. For example, in FIG. 6, the first terminal of the first one of the first switching transistors T1 from the left is electrically connected with the touch signal line L1, and the first terminal of the second one of the first switching transistors T1 from the left is electrically connected with the touch signal line L2. For example, in FIG. 7, the first terminal of the first one of the first switching transistors T1 from the left is electrically connected with the touch signal line L1, the first terminal of the second one of the first switching transistors T1 from the left is electrically connected with the touch signal line L2, and the first terminal of the third one of the first switching transistors T1 from the left is electrically connected with the touch signal line L3. Second terminals of the first switching transistors T1 are electrically connected with the same pad. For example, in FIG. 6, the second terminals of the first one of the first switching transistors T1 and the second one of the first switching transistors T1 from the left are electrically connected with Pad 1. In FIG. 7, the second terminals of the first one of the first switching transistors T1, the second one of the first switching transistors T1 and the third one of the first switching transistors T1 from the left are electrically connected with Pad 1).

In some implementations, as shown in FIGS. 6 and 7, the above-mentioned touch panel provided by the embodiment of the present disclosure further includes a compensation signal line MS and at least two second control signal lines. For example, the touch panel includes two second control signal lines MUX1' and MUX2' in FIG. 6, and the touch panel includes three second control signal lines, MUX1', MUX2' and MUX3' in FIG. 7). Each load compensation circuit 200 includes: second switching transistors T2 in one-to-one correspondence with the touch signal lines electrically connected, such as the touch signal lines L1 and L2 in FIG. 6, and the touch signal lines L1, L2 and L3 in FIG. 7. Gates of the second switching transistors T2 are electrically connected with the different second control signal lines. For example, in FIG. 6, the gate of the first one of the second switching transistors T2 from the left is electrically connected with the second control signal line MUX1', and the gate of the second one of the second switching transistors T2 from the left is electrically connected with the second control signal line MUX2'. For example, in FIG. 7, the gate of the first one of the second switching transistors T2 from the left is electrically connected with the second control signal line MUX1', the gate of the second one of the second switching transistors T2 from the left is electrically connected with the second control signal line MUX2', and the gate of the third one of the second switching transistors T2 from the left is electrically connected with the second control signal line MUX3'. First terminals of the second switching transistors T2 are electrically connected with the corresponding touch signal lines in one-to-one correspondence. For example, in FIG. 6, the first terminal of the first one of the second switching transistors T2 from the left is electrically connected with the touch signal line L1, and the first terminal of the second one of the second switching transistors T2 from the left is electrically connected with the touch signal line L2. For example, in FIG. 7, the first terminal of the first one of the second switching transistors T2 from the left is electrically connected with the touch signal line L1, the first terminal of the second one of the second switching transistors T2 from the left is electrically connected with the touch signal line L2, and the first terminal of the third one of the second switching transistors T2 from the left is electrically connected with the touch signal line L3. Second terminals of all the second switching transistors T2 are electrically connected with the compensation signal line MS.

In some implementations, in the above-mentioned touch panel provided by the embodiment of the present disclosure, as shown in FIGS. 6 and 7, for the first switching transistor T1 and the second switching transistor T2 which are electrically connected with the same touch signal line (such as L1) at the same time, while the first switching transistor T1 is turned on, the second switching transistor T2 is turned off; and while the first switching transistor T1 is turned off, the second switching transistor T2 is turned on. Specifically, as shown in FIG. 6, during a touch time period, Pad 1 loads the touch signals to the touch signal lines L1 and L2 in a time division, the touch signals are not loaded to L2 while the touch signals are loaded to L1. Namely the first switching transistor T1 electrically connected with L1 is on, and the first switching transistor T1 electrically connected with L2 is off. At this time, the second switching transistor T2 electrically connected with L1 is off, and the second switching transistor T2 electrically connected with L2 is on. Thus compensation signals are loaded to L2 by a compensation signal line MS through the second switching transistor T2 while Pad 1 loads the touch signals to L1 through the first switching transistor T1, so that the touch signal line L1 is charged completely. As shown in FIG. 7, during the touch time period, Pad 1 respectively loads the touch signals to the touch signal lines L1, L2 and L3 in a time division, while the touch signals are loaded to L1 and the touch signals are not loaded to L2 and L3. Namely the first switching transistor T1 electrically connected with L1 is on, and the first switching transistors T1 electrically connected with L2 and L3 are off. At this time, the second switching transistor T2 electrically connected with L1 is off, and the second switching transistors T2 electrically connected with L2 and L3 are on. Thus compensation signals are respectively loaded to L2 and L3 by the compensation signal line MS through the second switching transistors T2 while Pad 1 loads the touch signals to L1 through the first switching transistor T1, so that the touch signal line L1 is charged completely. And so on.

Figure 8:
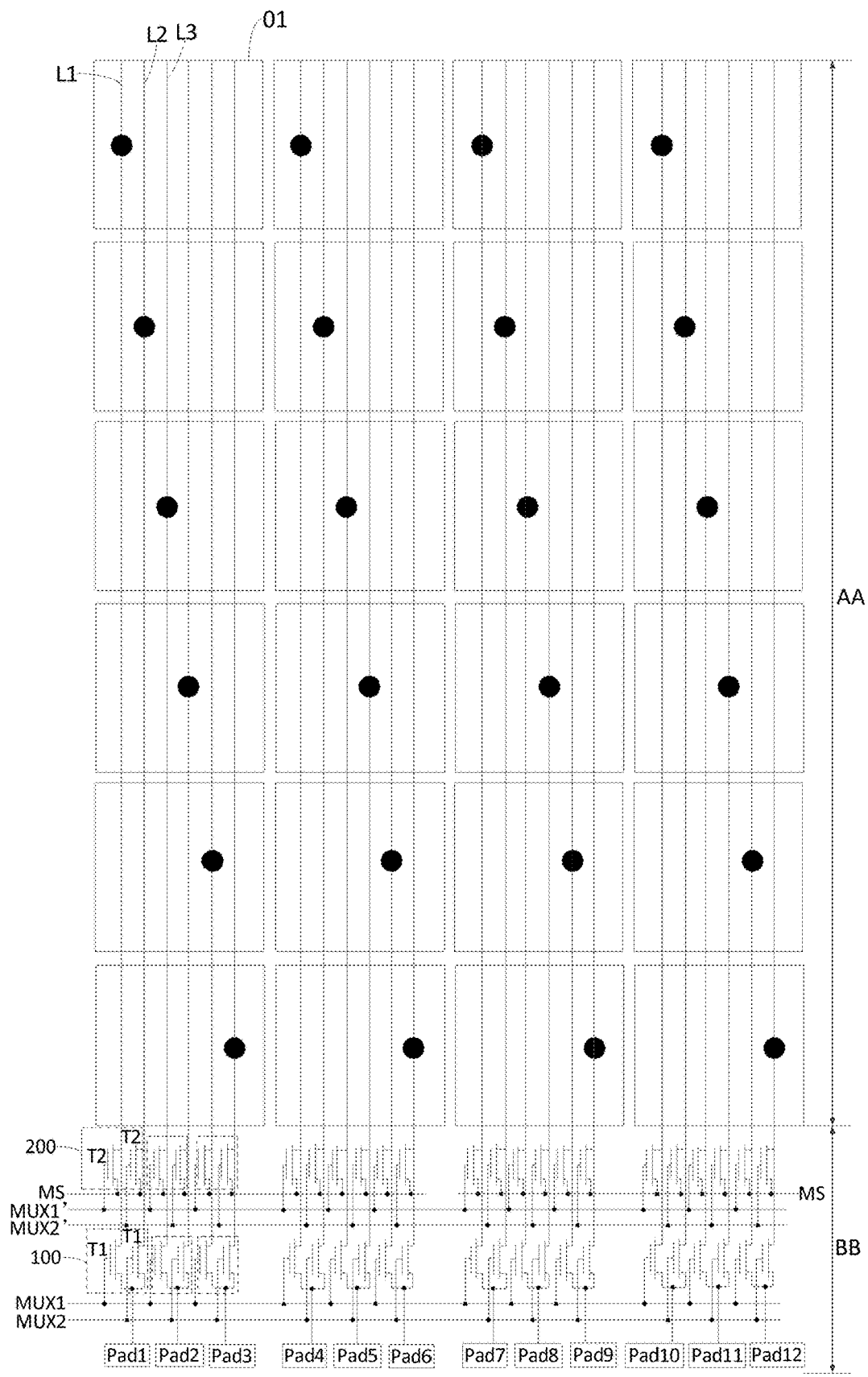
FIG. 8 is a fourth schematic diagram of the structure of a touch panel provided by an embodiment of the present disclosure.

In some implementations, in the above-mentioned touch panel provided by the embodiment of the present disclosure, as shown in FIGS. 6 and 7, the second terminals of all the second switching transistors T2 are electrically connected with the same compensation signal line MS. In this way, other compensation signal lines can be saved, and the complexity of wiring can be reduced. Of course, in a specific implementation, as shown in FIG. 8, all the second switching transistors T2 can be divided into left and right parts, the second terminals of the second switching transistors T2 in the left half part are electrically connected with one compensation signal line MS, and the second terminals of the second switching transistors T2 in the right half part are electrically connected with the other compensation signal line MS. And in specific implementations, the number of the compensation signal lines MS is not limited to one or two and can be designed according to actual needs.

In some implementations, in the above-mentioned touch panel provided by the embodiment of the present disclosure, as shown in FIGS. 5 to 9, the compensator is between the touch signal multiplexer and the touch area AA.

In some implementations, as shown in FIGS. 6 and 8, the above-mentioned touch panel provided by the embodiment of the present disclosure further includes a plurality of touch electrodes 01 which are electrically connected with the touch signal lines (L1, L2, L3 . . . ) in one-to-one correspondence. Each selection circuit 100 is electrically connected with two touch signal lines. For example, the selection circuit 100 on the leftmost side is separately electrically connected with the touch signal lines L1 and L2. The load compensation circuit 200 which corresponds to the selection circuit 100 is electrically connected with the same two touch signal lines. For example, the load compensation circuit 200 on the leftmost side corresponding to the selection circuit 100 on the leftmost side is also electrically connected with the touch signal lines L1 and L2. Two touch electrodes 01 which are correspondingly electrically connected with the same two touch signal lines, such as L1 and L2, are in the same row or the same column. For example, in FIG. 6, the two touch electrodes 01 which are correspondingly electrically connected with L1 and L2 are located adjacently in the same column.

Figure 9:
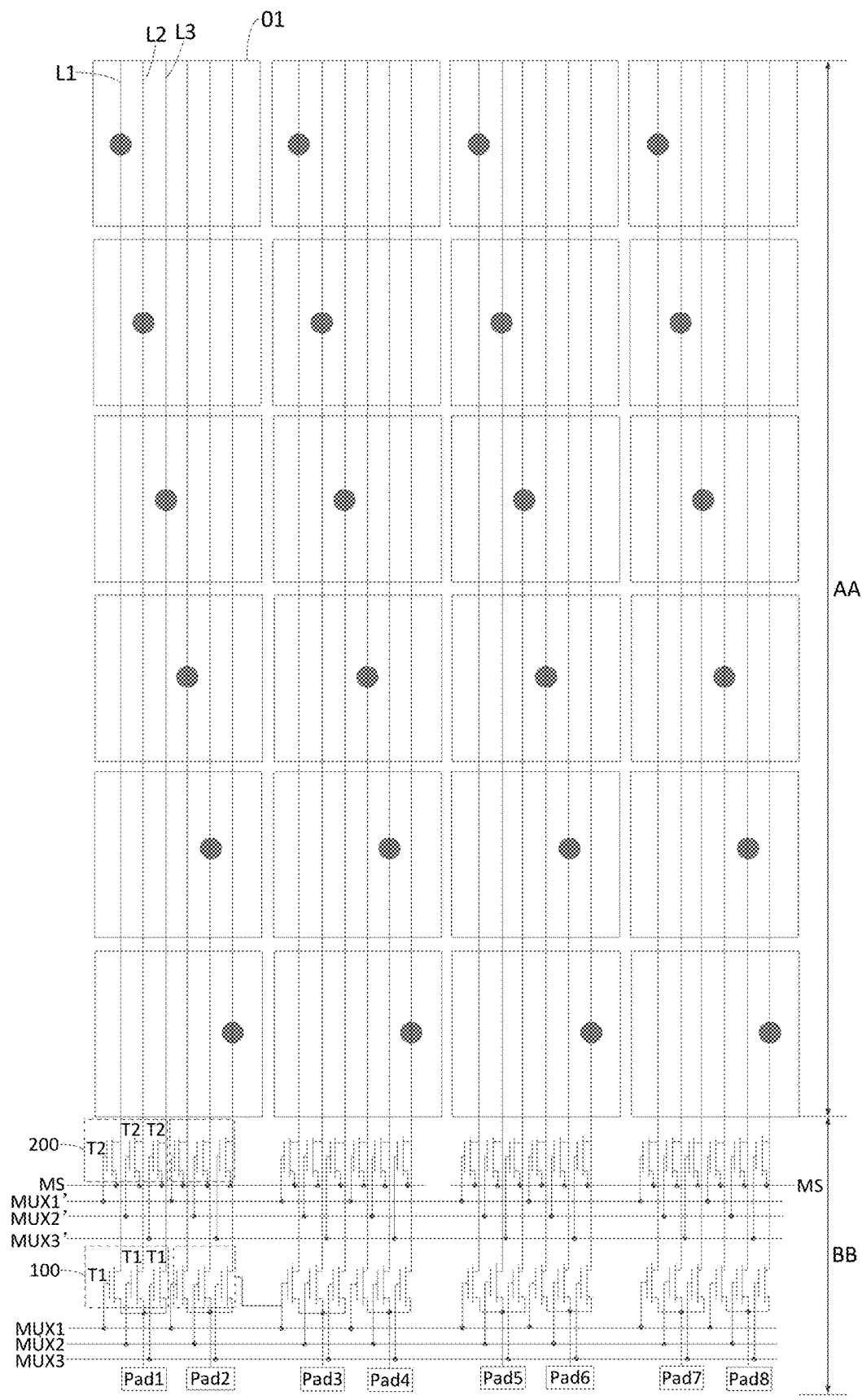
FIG. 9 is a fifth schematic diagram of the structure of a touch panel provided by an embodiment of the present disclosure.

In some implementations, as shown in FIGS. 7 and 9, the above-mentioned touch panel provided by the embodiment of the present disclosure further includes a plurality of touch electrodes 01 which are electrically connected with the touch signal lines (L1, L2, L3 . . . ) in one-to-one correspondence. Each selection circuit 100 is electrically connected with three touch signal lines. For example, the selection circuit 100 on the leftmost side is separately electrically connected with the touch signal lines L1, L2 and L3. The load compensation circuit 200 which corresponds to the selection circuit 100 is electrically connected with the same three touch signal lines. For example, the load compensation circuit 200 on the leftmost side corresponding to the selection circuit 100 on the leftmost side is also electrically connected with the touch signal lines L1, L2 and L3. Three touch electrodes 01 which are correspondingly electrically connected with the same three touch signal lines, such as L1, L2 and L3, are in the same row or the same column. For example, in FIG. 7, the three touch electrodes 01 which are correspondingly electrically connected with L1, L2 and L3 are located adjacently in the same column.

It should be noted that, the above-mentioned touch panel provided by the embodiment of the present disclosure is an example in which one pad is electrically connected with two or three touch signal lines at the same time. Of course, in a specific implementation, one pad may also be electrically connected with four or even more touch signal lines at the same time. This can be designed according to actual needs, such as the size of the touch panel, and will not be listed one by one in the present disclosure.

Further, in a specific implementation, in the touch panel provided by the embodiment of the present disclosure, as shown in FIGS. 6 and 7, all the first switching transistors T1 and the second switching transistors T2 are N type transistors.

Of course, in a specific implementation, in the above-mentioned touch panel provided by the embodiment of the present disclosure, all the first switching transistors T1 and the second switching transistors T2 may also be P type transistors.

Further, in a specific implementation, the N type transistors are turned on under a high potential and turned off under a low potential; and the P type transistors are turned off under a high potential and turned on under a low potential.

It should be noted that, the switching transistors mentioned in the above embodiments of the present disclosure may be thin film transistors (TFT), or metal oxide semiconductor field effect transistors (MOSFET), which are not limited herein. In a specific implementation, the functions of the first terminals and the second terminals of these switching transistors may be interchanged according to the type of the transistors and different input signals, so that they are not differentiated specifically here. Specifically, the first terminals of the switching transistors mentioned in the above embodiments of the present disclosure may be sources, the second terminals may be drains, or the first terminals may be drains, and the second terminals may be sources, which are not differentiated specifically here.

Figure 10:
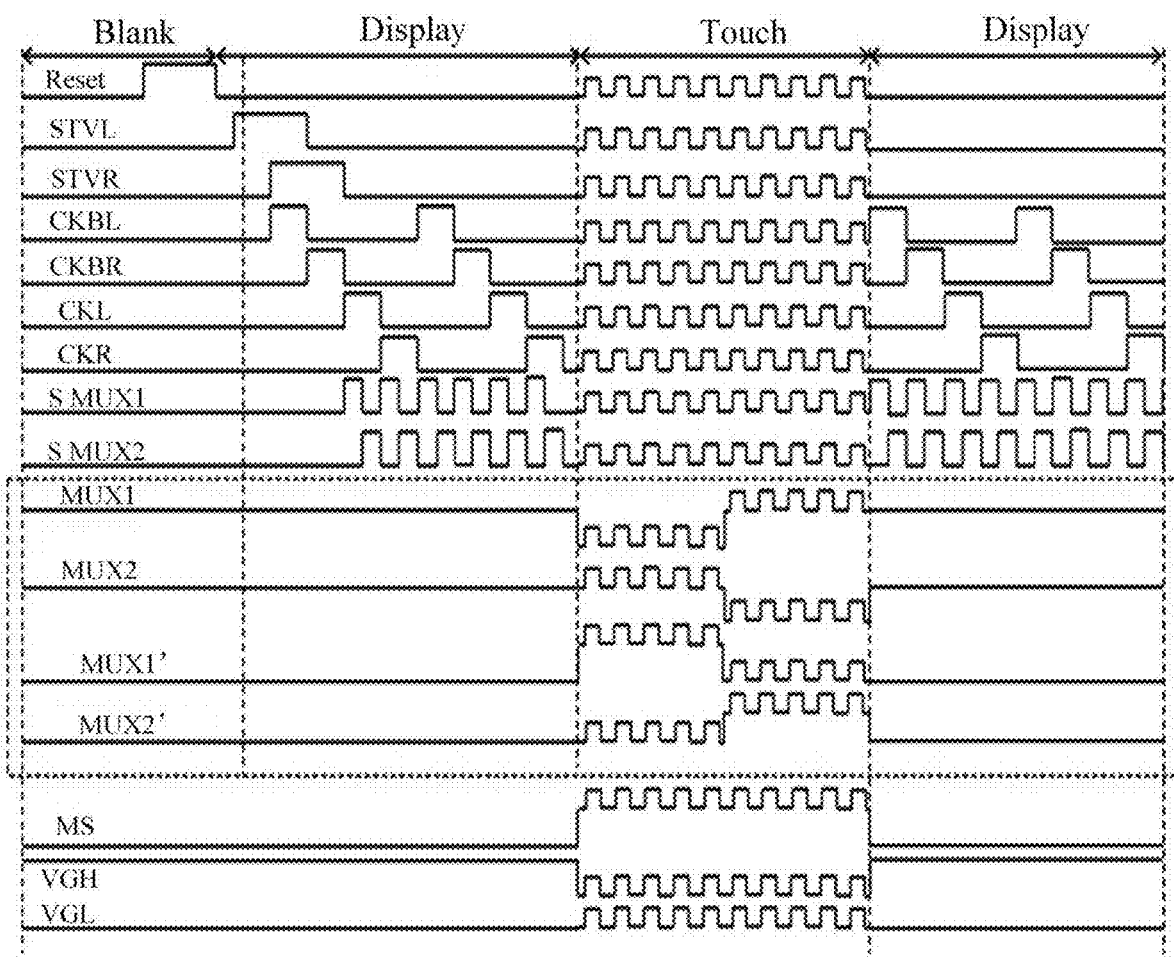
FIG. 10 is a circuit timing diagram of the touch panel as shown in FIG. 6 and FIG. 8.
Figure 11:
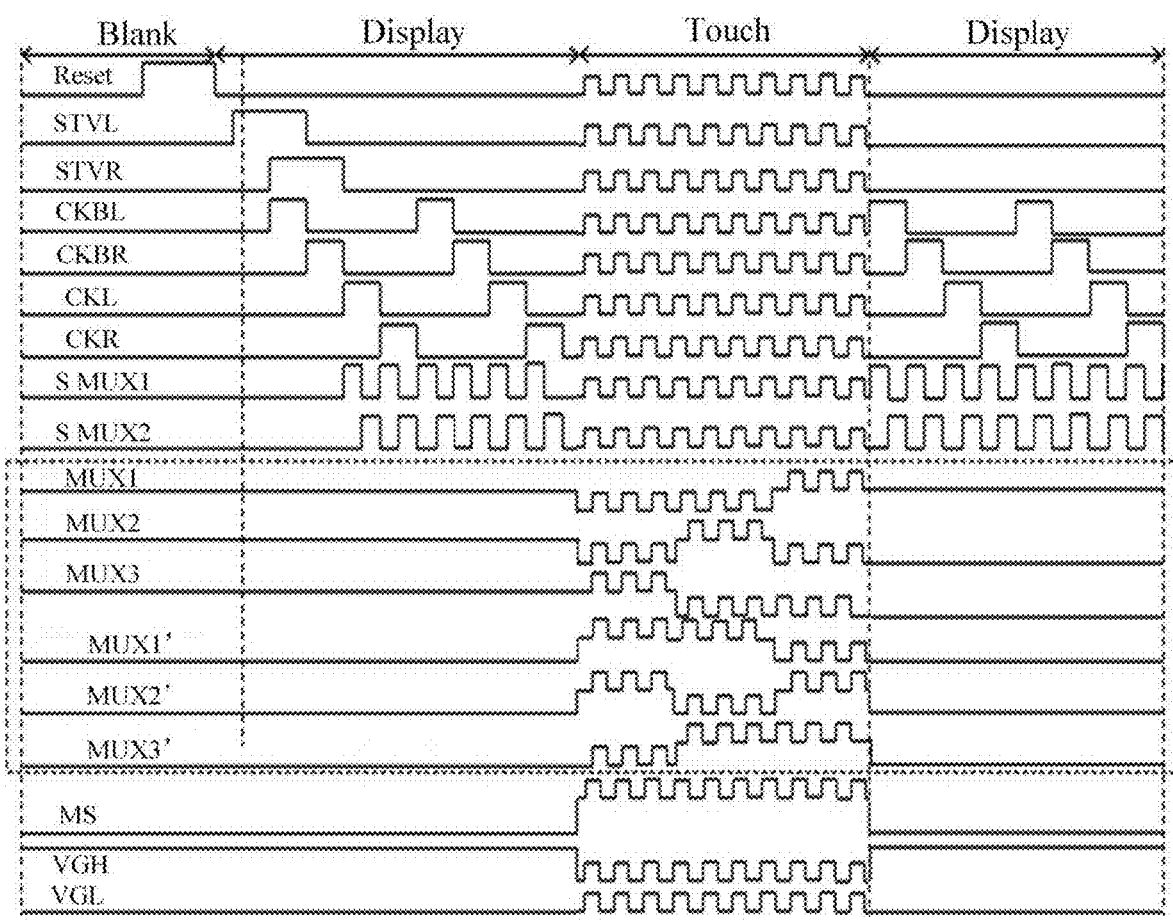
FIG. 11 is a circuit timing diagram of the touch panel as shown in FIG. 7 and FIG. 9.

The driving principle of the touch panel, as shown in FIGS. 6 and 7, provided by the embodiments of the present disclosure will be described in detail below through the specific embodiments. The corresponding circuit control timing diagrams are shown in FIGS. 10 and 11, and all of the first switching transistors T1 and the second switching transistors T2 in FIGS. 6 and 7 are N type transistors. In the embodiments of the present disclosure, the non-touch area includes IC1 and IC2 as an example for illustration.

Figure 12:
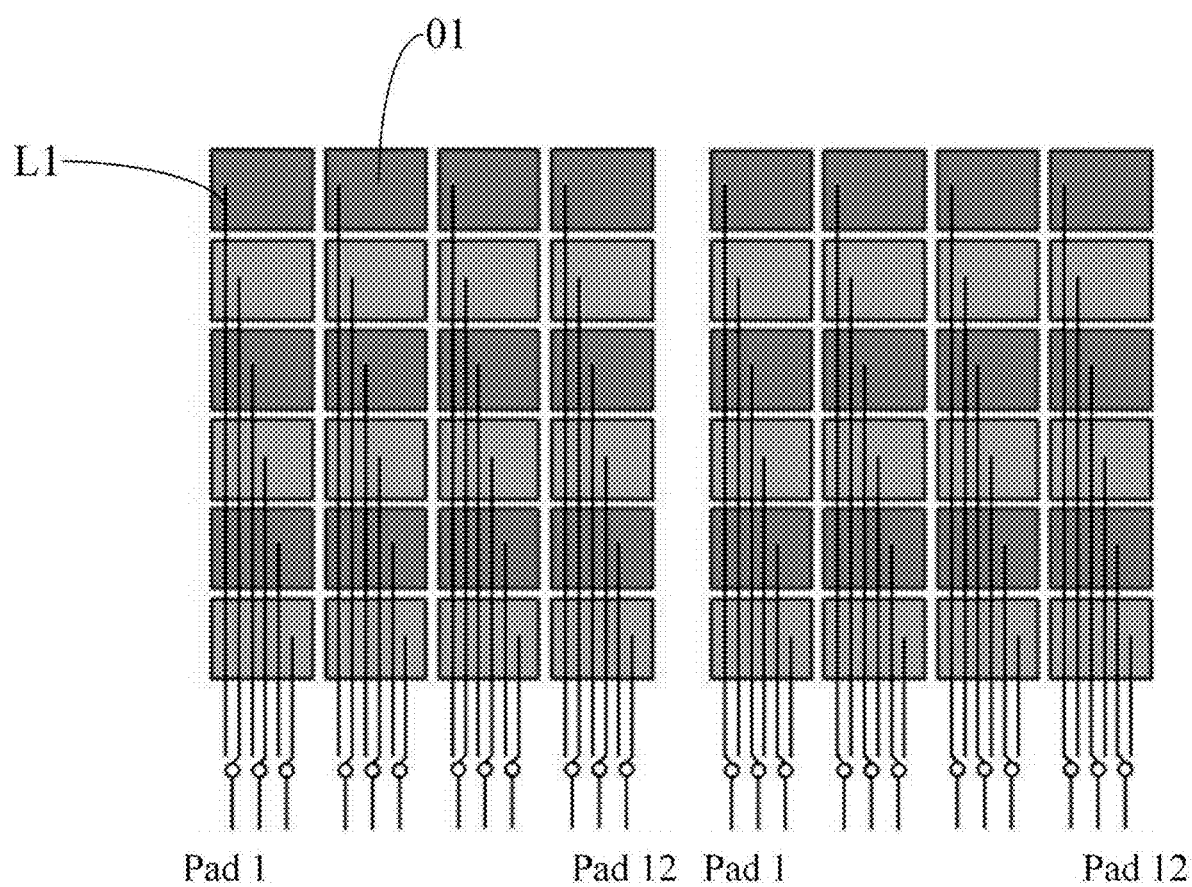
FIGS. 12 and 13 are schematic diagrams of the driving principle of touch electrodes corresponding to FIG. 10.

As shown in FIGS. 6 and 10, in the touch stage (Touch), the Touch is divided into two time periods. In the first time period: the first control line MUX1 is for low-level signals, and the first switching transistors T1 electrically connected with odd-numbered touch signal lines are all off; the first control line MUX2 is for high-level signals, and the first switching transistors T1 electrically connected with even-numbered touch signal lines are all on; the second control line MUX1' is for high-level signals, and the second switching transistors electrically connected with odd-numbered touch signal lines are all on; the second control line MUX2' is for low-level signals, and the second switching transistors electrically connected with even-numbered touch signal lines are all off; the selection circuits 100 load touch signals to the electrically connected even-numbered touch signal lines (L2, L4, L6 . . . ) through the corresponding pads (Pad 1, Pad 2, Pad 3 . . . ), and the load compensation circuits 200 load compensation signals to the electrically connected odd-numbered touch signal lines (L1, L3, L5 . . . ) through the compensation signal line MS. In the second time period: the first control line MUX1 is for high-level signals, and the first switching transistors T1 electrically connected with odd-numbered touch signal lines are all on; the first control line MUX2 is for low-level signals, and the first switching transistors T1 electrically connected with even-numbered touch signal lines are all off; the second control line MUX1' is for low-level signals, and the second switching transistors T2 electrically connected with odd-numbered touch signal lines are all off; the second control line MUX2' is for high-level signals, and the second switching transistors T2 electrically connected with even-numbered touch signal lines are all on; the selection circuits 100 load touch signals to the electrically connected odd-numbered touch signal lines (L1, L3, L5 . . . ) through the corresponding pads (Pad 1, Pad 2, Pad 3 . . . ), and the load compensation circuits 200 load compensation signals to the electrically connected even-numbered touch signal lines (L2, L4, L6 . . . ) through the compensation signal line MS. Specifically, as shown in FIG. 12, FIG. 12 is a schematic diagram of the principle of loading touch signals to all touch electrodes 01 in a touch area as shown in FIGS. 6 and 10. In FIG. 12, the left half part (left four columns) is a schematic diagram of loading the touch signals to the touch electrodes in even-numbered rows by the pads, and the right half part (right four columns) is a schematic diagram of loading the touch signals to the touch electrodes in odd-numbered rows by the pads. It should be noted that, FIG. 12 is only an example in which the touch area includes four columns and six rows of touch electrodes 01. Of course, in a specific implementation, the number of the touch electrodes 01 is far more than the number shown in FIG. 12. That is, in the first time period of Touch, AFE (analog front end) in IC1 loads the touch signals to the touch electrodes 01 in the even-numbered rows in the left two columns in the left half part in FIG. 12, AFE in IC2 loads the touch signals to the touch electrodes 01 in the even-numbered rows in the right two columns in the left half part in FIG. 12, and the compensation signal line MS loads the compensation signals to the touch electrodes 01 in the odd-numbered rows through the second switching transistors T2 corresponding to the touch electrodes 01 in the odd-numbered rows. In the second time period of Touch, AFEs in IC1 and IC2 respectively load the touch signals to the touch electrodes 01 in the odd-numbered rows in the left two columns and the right two columns in the left half part which are not processed in the first time period, and the compensation signal line MS loads the compensation signals to the touch electrodes 01 in the even-numbered rows through the second switching transistors T2 corresponding to the touch electrodes 01 in the even-numbered rows.

Figure 13:
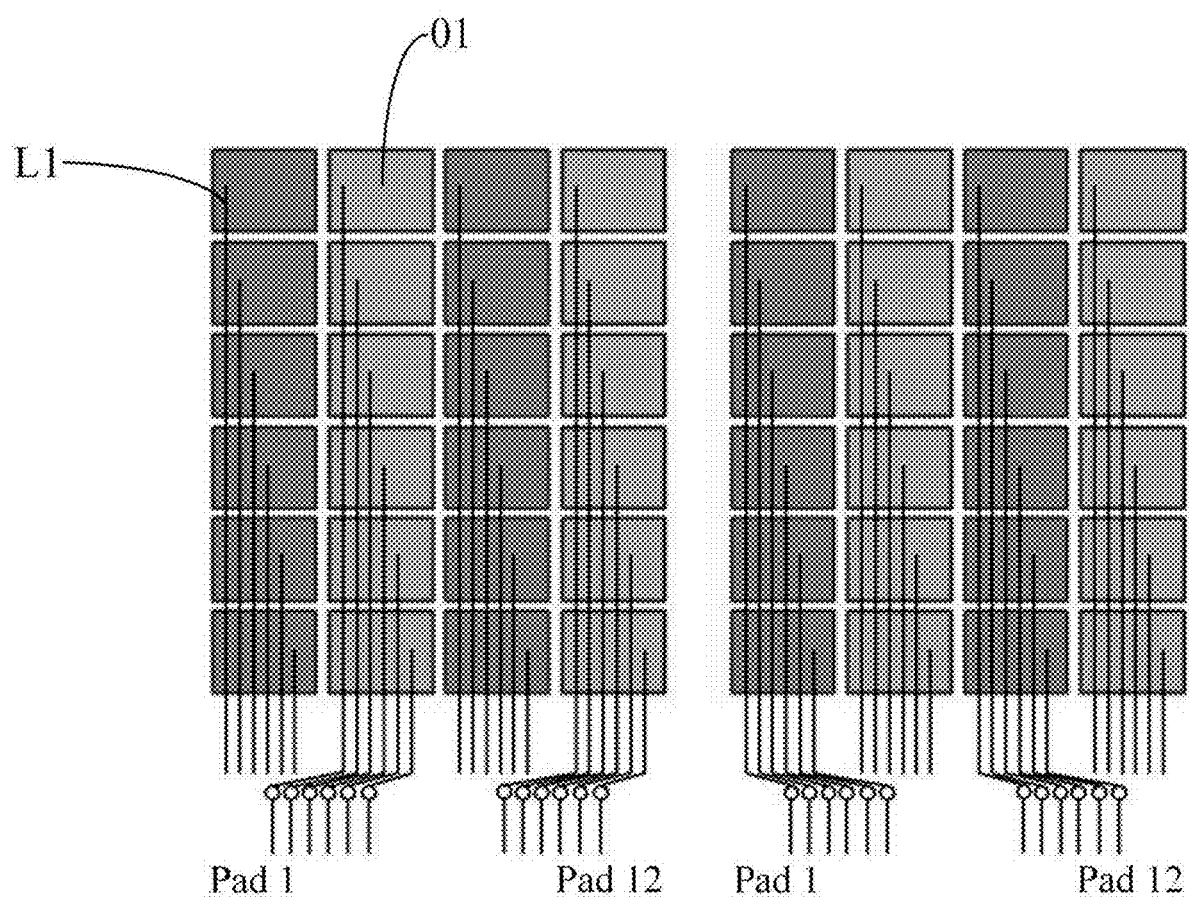

In a specific implementation, the structure as shown in FIG. 6 is illustrated by taking an example in which two touch electrodes 01 correspondingly electrically connected with one pad are in the same column. Of course, two touch electrodes 01 correspondingly electrically connected with one pad may also be in the same row, and the touch signals are loaded every other column. Specifically, as shown in FIG. 13, FIG. 13 is a schematic diagram of another effect of loading the touch signals to the touch electrodes 01 corresponding to the timing diagram shown in FIG. 10 in which when the two touch electrodes 01 correspondingly electrically connected with one pad may also be in the same row, the spaced touch signal lines may also be connected by a bridge or a jumper. In FIG. 13, the left half part (left four columns) is a schematic diagram of loading the touch signals to the touch electrodes in even-numbered columns by the pads, and the right half part (right four columns) is a schematic diagram of loading the touch signals to the touch electrodes in odd-numbered columns by the pads. That is, in the first time period of Touch, AFE (analog front end) in IC1 loads the touch signals to the touch electrodes 01 in the even-numbered columns in the left two columns in the left half part in FIG. 13, AFE in IC2 loads the touch signals to the touch electrodes 01 in the even-numbered columns in the right two columns in the left half part in FIG. 13, and the compensation signal line MS loads the compensation signals to the touch electrodes 01 in the odd-numbered columns through the second switching transistors T2 corresponding to the touch electrodes 01 in the odd-numbered columns. In the second time period of Touch, AFEs in IC1 and IC2 respectively load the touch signals to the touch electrodes 01 in the odd-numbered columns in the left two columns and the right two columns in the left half part which are not processed in the first time period, and the compensation signal line MS loads the compensation signals to the touch electrodes 01 in the even-numbered columns through the second switching transistors T2 corresponding to the touch electrodes 01 in the even-numbered columns.

Figure 14:
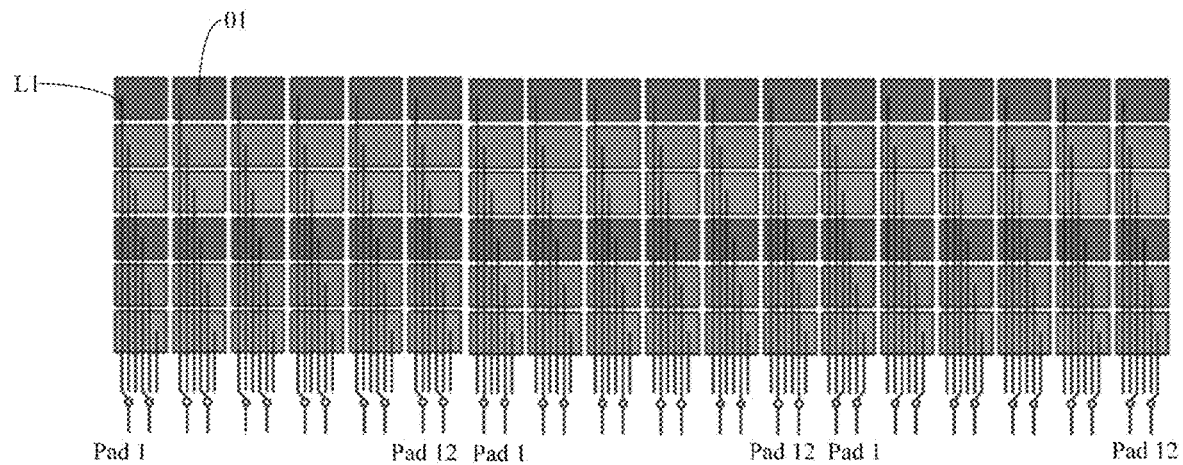
FIGS. 14 and 15 are schematic diagrams of the driving principle of touch electrodes corresponding to FIG. 11.

As shown in FIGS. 7 and 11, the difference between this embodiment and FIGS. 6 and 10 is that: in FIGS. 6 and 10, one pad is electrically connected with two touch signal lines, and in FIGS. 7 and 11, one pad is electrically connected with three touch signal lines. Specifically, in the touch stage (Touch), as shown in FIGS. 7 and 11, the touch time period is divided into three time periods, in the first time period: the first control lines MUX1 and MUX2 are both for low-level signals, and the first two of the first switching transistors T1 from the left in each selection circuit 100 are both off; the first control line MUX3 is for high-level signals, and the third one of the first switching transistors T1 from the left in each selection circuit 100 is on; the second control lines MUX1' and MUX2' are for high-level signals, and the first two of the second switching transistors T2 from the left in each load compensation circuit 200 are all on; the second control line MUX3' is for low-level signals, and the third one of the second switching transistors T2 from the left in each load compensation circuit 200 is off; the selection circuits 100 load the touch signals to the electrically connected touch signal lines (L3, L6 . . . ) through the third one of the first switching transistors T1 from the left by the corresponding pads (Pad 1, Pad 2, Pad 3 . . . ), and the load compensation circuits 200 load the compensation signals to the electrically connected touch signal lines (L1, L2, L4, L5 . . . ) through the first two of the second switching transistors T2 from the left. In the second time period: the first control lines MUX1 and MUX3 are both for low-level signals, and the first one and the third one of the first switching transistors T1 from the left in each selection circuit 100 are both off; the first control line MUX2 is for high-level signals, and the second one of the first switching transistors T1 from the left in each selection circuit 100 is on; the second control lines MUX1' and MUX3' are for high-level signals, the first one and the third one of the second switching transistors T2 from the left in each load compensation circuit 200 are both on; the second control line MUX2' is for low-level signals, and the second one of the second switching transistors T2 from the left in each load compensation circuit 200 is off; the selection circuits 100 load the touch signals to the electrically connected touch signal lines (L2, L5 . . . ) through the second one of the first switching transistors T1 from the left by the corresponding pads (Pad 1, Pad 2, Pad 3 . . . ), and the load compensation circuits 200 load the compensation signals to the electrically connected touch signal lines (L1, L3, L4, L6 . . . ) through the first one and the third one of the second switching transistors T2 from the left. In the third time period: the first control line MUX1 is for high-level signals, and the first one of the first switching transistors T1 from the left in each selection circuit 100 is on; the first control lines MUX2 and MUX3 are for low-level signals, and the second one and the third one of the first switching transistors T1 from the left in each selection circuit 100 are both off; the second control line MUX1' is for low-level signals, and the first one of the second switching transistors T2 from the left in each load compensation circuit 200 is off; the second control lines MUX2' and MUX3' are for high-level signals, and the second one and the third one of the second switching transistors T2 from the left in each load compensation circuit 200 are both on; and the selection circuits 100 load the touch signals to the electrically connected touch signal lines (L1, L4 . . . ) through the first one of the first switching transistors T1 from the left by the corresponding pads (Pad 1, Pad 2, Pad 3 . . . ), and the load compensation circuits 200 load the compensation signals to the electrically connected touch signal lines (L2, L3, L5, L6 . . . ) through the second one and the third one of the second switching transistors T2 from the left. Specifically, as shown in FIG. 14, FIG. 14 is a schematic diagram corresponding to the effect of loading touch signals to all touch electrodes 01 in a touch area as shown in FIGS. 7 and 11. In FIG. 14, the left half part (the touch electrodes corresponding to Pad 1 and Pad 12 in Columns 1-6 from the left) is a schematic diagram of loading the touch signals to the touch electrodes in the first row, the fourth row, the seventh row . . . by the pads, the middle part (the touch electrodes corresponding to Pad 1-Pad 12 in Columns 7-12 from the left) is a schematic diagram of loading the touch signals to the touch electrodes in the second row, the fifth row, the eighth row . . . by the pads, and the right half part (the touch electrodes corresponding to Pad 1-Pad 12 in Columns 13-18 from the left) is a schematic diagram of loading the touch signals to the touch electrodes in the third row, the sixth row, the ninth row . . . by the pads. It should be noted that, FIG. 14 is only an example in which the touch area includes six columns and six rows of touch electrodes 01. Of course, in a specific implementation, the number of the touch electrodes 01 is far more than the number shown in FIG. 14. That is, in the first time period of Touch, AFE (analog front end) in IC1 loads the touch signals to the touch electrodes in the first row, the fourth row . . . in Columns 1-3 in Columns 1-6 from the left in FIG. 14, AFE in IC2 loads the touch signals to the touch electrodes in the first row, the fourth row . . . in Columns 4-6 in Columns 1-6 from the left in FIG. 14, and the compensation signal line MS loads the compensation signals to the touch electrodes 01 in the second row, the third row, the fifth row, the sixth row . . . in Columns 1-6 from the left in FIG. 14. In the second time period of Touch, AFEs in IC1 and IC2 respectively load the touch signals to the touch electrodes 01 in the second row, the fifth row . . . in Columns 1-3 and Columns 4-6 in Columns 1-6 from the left which are not processed in the first time period, and the compensation signal line MS loads the compensation signals to the touch electrodes 01 in the first row, the third row, the fourth row, the sixth row . . . in Columns 1-6 from the left in FIG. 14. In the third time period of Touch, AFEs in IC1 and IC2 respectively load the touch signals to the touch electrodes 01 in the third row, the sixth row . . . in Columns 1-3 and Columns 4-6 in Columns 1-6 from the left which are not processed in the first time period and in the second time period, and the compensation signal line MS loads the compensation signals to the touch electrodes 01 in the first row, the second row, the fourth row, the fifth row . . . in Columns 1-6 from the left in FIG. 14.

Figure 15:
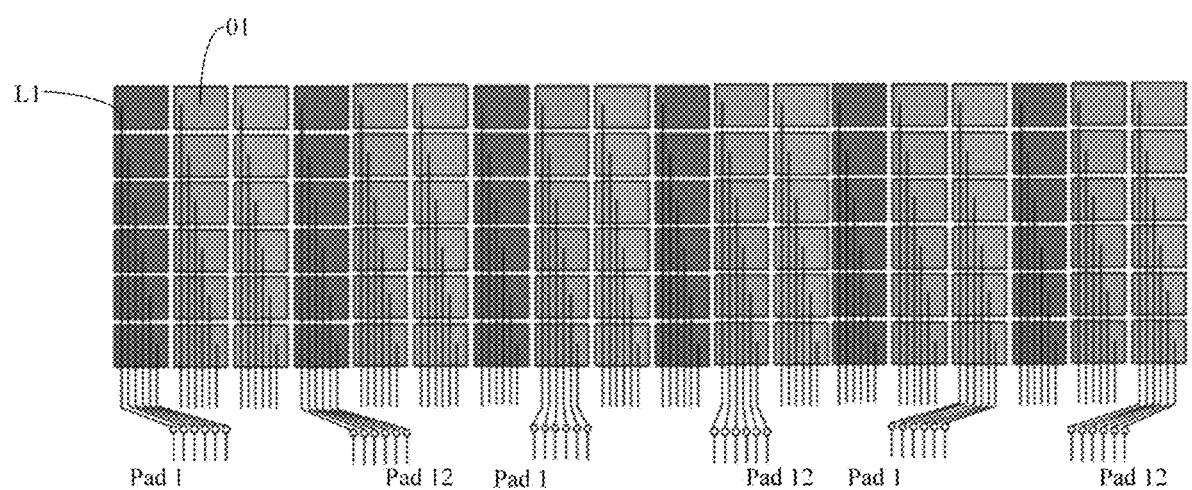

In a specific implementation, the structure as shown in FIG. 7 is illustrated by taking an example in which three touch electrodes 01 correspondingly electrically connected with one pad are in the same column. Of course, three touch electrodes 01 correspondingly electrically connected with one pad may also be in the same row, and the touch signals are loaded every other column. Specifically, as shown in FIG. 15, FIG. 15 is a schematic diagram of another effect of loading the touch signals to the touch electrodes 01 corresponding to the timing diagram shown in FIG. 11 in which when the three touch electrodes 01 correspondingly electrically connected with one pad may also be in the same row, the spaced touch signal lines may also be connected by a bridge or a jumper. In FIG. 15, the left half part (the touch electrodes corresponding to Pad 1 to Pad 12 in Columns 1-6 from the left) is a schematic diagram of loading the touch signals to the touch electrodes in the first column, the fourth column, the seventh column . . . by the pads, the middle part (the touch electrodes corresponding to Pad 1 to Pad 12 in Columns 7-12 from the left) is a schematic diagram of loading the touch signals to the touch electrodes in the second column, the fifth column, the eighth column . . . by the pads, and the right half part (the touch electrodes corresponding to Pad 1-Pad 12 in Columns 13-18 from the left) is a schematic diagram of loading the touch signals to the touch electrodes in the third column, the sixth column, the ninth column . . . by the pads. That is, in the first time period of Touch, AFE in IC1 loads the touch signals to the touch electrodes in the first column, the fourth column . . . in Columns 1-3 in Columns 1-6 from the left in FIG. 15, AFE in IC2 loads the touch signals to the touch electrodes in the first column, the fourth column . . . in Columns 4-6 in Columns 1-6 from the left in FIG. 15, and the compensation signal line MS loads the compensation signals to the touch electrodes 01 in the second column, the third column, the fifth column, the sixth column . . . in Columns 1-6 from the left in FIG. 15. In the second time period of Touch, AFEs in IC1 and IC2 respectively load the touch signals to the touch electrodes 01 in the second column, the fifth column . . . in Columns 1-3 and Columns 4-6 in Columns 1-6 from the left which are not processed in the first time period, and the compensation signal line MS loads the compensation signals to the touch electrodes 01 in the first column, the third column, the fourth column, the sixth column . . . in Columns 1-6 from the left in FIG. 15. In the third time period of Touch, AFEs in IC1 and IC2 respectively load the touch signals to the touch electrodes 01 in the third column, the sixth column . . . in Columns 1-3 and Columns 4-6 in Columns 1-6 from the left which are not processed in the first time period and in the second time period, and the compensation signal line MS loads the compensation signals to the touch electrodes 01 in the first column, the second column, the fourth column, the fifth column . . . in Columns 1-6 from the left in FIG. 15.

In summary, the above-mentioned touch panel provided by the embodiment of the present disclosure can not only solve the problem of the limited number of the pads in the existing high-resolution medium-size to large-size touch screen product, but also solve the problem of incomplete charging to the touch electrodes in the charging process.

Based on the same inventive concept, an embodiment of the present disclosure further provides a driving method of a touch panel, including:

during a touch time period, loading, by each selection circuit, touch signals to the electrically connected touch signal lines in a time division through a pad; and loading, by each load compensation circuit, compensation signals to other touch signal lines while the selection circuit loads the touch signals to one of the touch signal lines.

According to the driving method of the touch panel provided by the embodiments of the present disclosure, when the pad loads the touch signals to one of the touch signal lines electrically connected with the pad, the load compensation circuit loads compensation signals to other touch signal lines electrically connected with the pad without the loaded touch signals, and then parasitic capacitance generated between the touch electrode with the loaded touch signals and the touch electrodes without the loaded touch signals cannot affect the loading of the touch signals, so that the touch electrode is fully charged.

Further, in a specific implementation, in the driving method of the touch panel provided by the embodiments of the present disclosure, the touch time period is divided into two time periods. In the first time period, each selection circuit loads the touch signals to the electrically connected first touch signal line through the corresponding pad, and each load compensation circuit loads the compensation signals to the electrically connected second touch signal line. In the second time period, each selection circuit loads the touch signals to the electrically connected second touch signal line through the corresponding pad, and each load compensation circuit loads the compensation signals to the electrically connected first touch signal line.

Further, in a specific implementation, in the driving method of the touch panel provided by the embodiment of the present disclosure, the touch time period is divided into three time periods. In the first time period, each selection circuit loads the touch signals to the electrically connected first touch signal line through the corresponding pad, and each load compensation circuit loads the compensation signals to the electrically connected second and third touch signal lines. In the second time period, each selection circuit loads the touch signals to the electrically connected second touch signal line through the corresponding pad, and each load compensation circuit loads the compensation signals to the electrically connected first and third touch signal lines. In the third time period, each selection circuit loads the touch signals to the electrically connected third touch signal line through the corresponding pad, and each load compensation circuit loads the compensation signals to the electrically connected first and second touch signal lines.

In a specific implementation, the working principle of the above-mentioned driving method of the touch panel may refer to the working principle described in the above-mentioned touch panel, and will not be repeated here.

Figure 16:
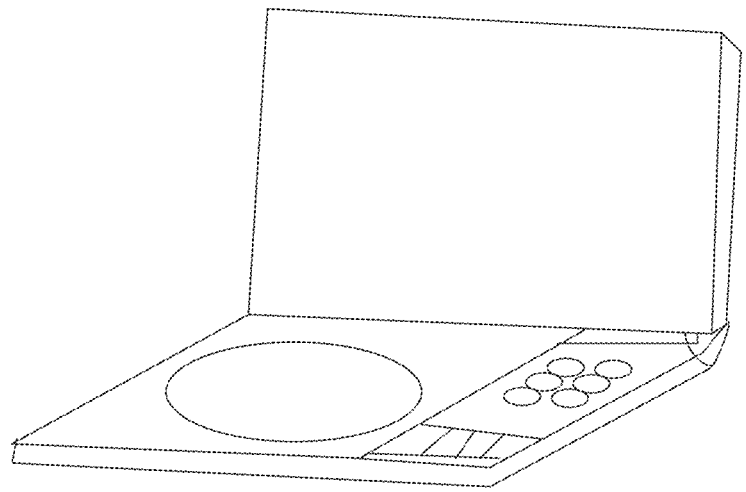
FIG. 16 is a first schematic diagram of the structure of a display device provided by an embodiment of the present disclosure.
Figure 17:
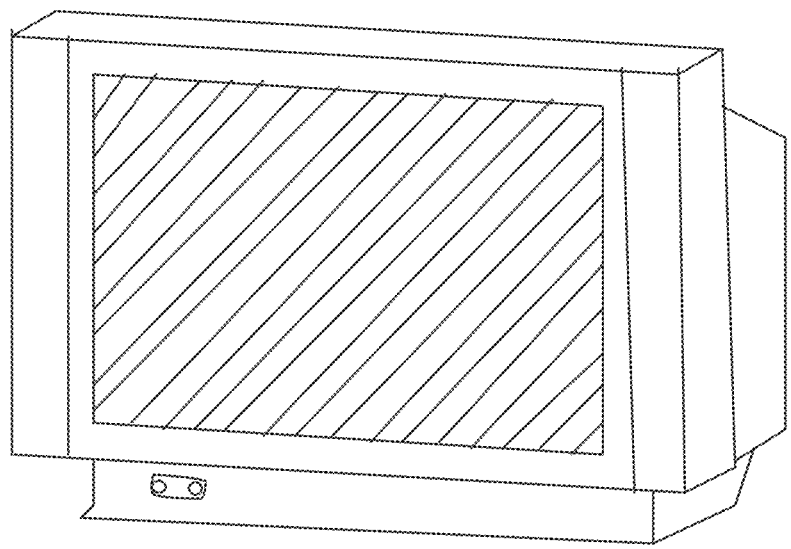
FIG. 17 is a second schematic diagram of the structure of a display device provided by an embodiment of the present disclosure.

Based on the same inventive concept, the embodiments of the present disclosure further provide a display device including a display panel and a touch panel which are stacked, and the touch panel is the touch panel provided by any one of the above embodiments of the present disclosure. The display device may be a touch panel of a product with a display function, such as a mobile phone, a tablet computer, a TV, a display, a notebook computer, a digital photo frame, a navigator, a wearable display, a video camera, and the like. For example, the display device may be a notebook computer as shown in FIG. 16 and may also be a TV as shown in FIG. 17 and the like. The implementation of the display device may refer to the above embodiments of the touch panel and will not be repeated here.

It should be noted that the touch area of the touch panel provided by the embodiments of the present disclosure covers the display area of the display panel, and the non-touch area of the touch panel covers the non-display area of the display panel.

In some implementations, in the display device provided by the embodiments of the present disclosure, the display area of the display panel includes a plurality of common electrode blocks, and the common electrode blocks are multiplexed as touch electrodes of the touch panel. In this way, the touch panel does not require the independent manufacturing of a single layer of touch electrodes so that the thickness of the touch panel is reduced.

Figure 18:
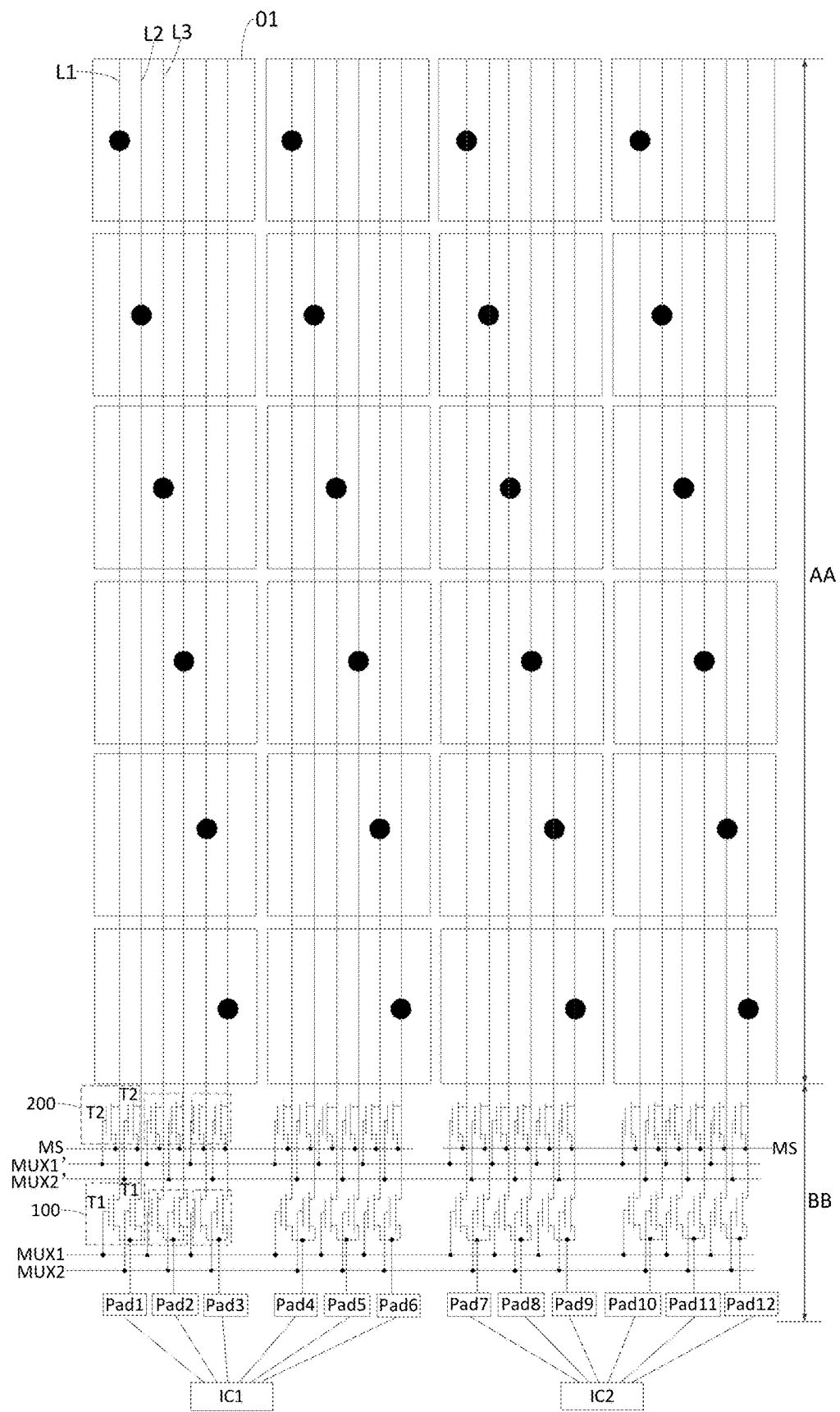
FIG. 18 is a third schematic diagram of the structure of a display device provided by an embodiment of the present disclosure.
Figure 19:
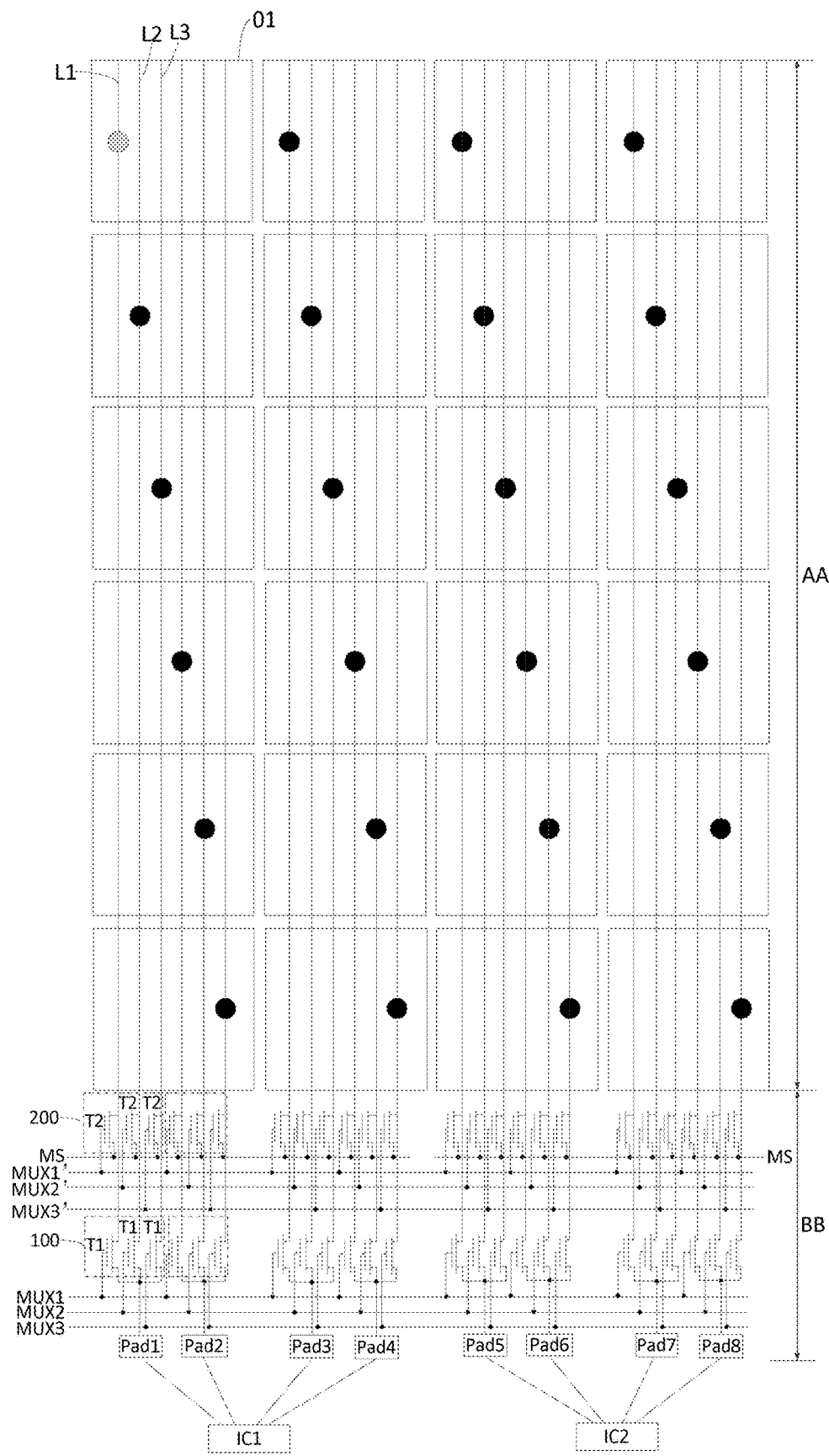
FIG. 19 is a fourth schematic diagram of the structure of a display device provided by an embodiment of the present disclosure.

In some implementations, in the above-mentioned display device provided by the embodiments of the present disclosure, as shown in FIGS. 18 and 19, the non-display area of the display panel includes a first driving chip IC1 and a second driving chip IC2, in all the pads (Pad 1, Pad 2, Pad 3 . . . ), in FIG. 18, twelve Pads are included as an example, wherein one half of the serially arranged pads (Pad 1, Pad 2, Pad 3, Pad 4, Pad 5, Pad 6) are electrically connected with the first driving chip IC1, and the other half of the serially arranged pads (Pad 7, Pad 8, Pad 9, Pad 10, Pad 11, Pad 12) are electrically connected with the second driving chip IC2. In FIG. 19, eight Pads are included as an example, wherein one half of the serially arranged pads (Pad 1, Pad 2, Pad 3, Pad 4) are electrically connected with the first driving chip IC1, and the other half of the serially arranged pads (Pad 5, Pad 6, Pad 7, Pad 8) are electrically connected with the second driving chip IC2. Of course, in a specific implementation, the number of the pads in the touch panel is not limited to the number shown in FIGS. 18 and 19, and FIGS. 18 and 19 are only used for explaining and illustrating the present disclosure.

In a specific implementation, the display area of the display panel generally includes a plurality of gate lines and data lines arranged crosswise, the gate lines and the data lines define a plurality of pixels crosswise, and each pixel includes a pixel circuit, a display device and other structures. The non-display area includes a source driving circuit for transmitting data signals to the data lines, a gate driving circuit for transmitting gate signals to the gate lines and other various circuit structures.

In a specific implementation, as shown in FIGS. 10 and 11, FIGS. 10 and 11 are timing diagrams of various signal ends in a frame of time. A frame of time is divided into a blank stage (Blank), display stages (display) and a touch stage (Touch) in which the above-mentioned touch panel provided by the embodiment of the present disclosure works. The touch stage (Touch) is between two display stages (Display) in every frame of time, and the working principle of the touch stage (Touch) refers to the introduction in the above-mentioned touch panel. In the blank stage (Blank), the reset signal end (Reset) performs resetting. In the display stage, frame trigger ends (STVL, STVR) sequentially input start trigger signals, clock signal ends (CKBL, CKBR, CKL, CKR) sequentially input clock signals, signals of power signal ends (VGH, VGL) are used for cooperating to scan the gate lines row by row, and a selection circuit electrically connected with the data signal lines S (S MUX1, S MUX1 controls the working of the selection circuit) sequentially loads the data signals to the data lines to realize the display of an image.

Further, in a specific implementation, the above-mentioned display device provided by the embodiments of the present disclosure may be a liquid crystal display device, and may also be an organic light emitting display device.

Embodiments of the present disclosure provide a touch panel, a driving method thereof and a display device, the touch panel adopts a touch signal multiplexer to load touch signals to touch signal lines, and at least correspondingly electrically connects one pad with two touch signal lines, so that the number of the pads can be greatly reduced for the large-size high-resolution touch screen. In addition, while the pad loads the touch signals to one of the touch signal lines electrically connected with the pad and does not load the touch signals to other touch signal lines electrically connected with the pad, a parasitic capacitance can be generated between a touch electrode which is electrically connected with the touch signal line with the loaded touch signals and the touch electrode which is electrically connected with the touch signal line without the loaded touch signals. The parasitic capacitance can cause the touch electrode with the loaded touch signals to discharge, so that the touch electrode is not fully charged. Thus, by setting the load compensation circuits in one-to-one correspondence with the selection circuits, while the pad loads the touch signals to one of the touch signal lines electrically connected with the pad, the load compensation circuit can load compensation signals to other touch signal lines electrically connected with the pad without the loaded touch signals, and then the parasitic capacitances generated between the touch electrode with the loaded touch signals and the touch electrodes without the loaded touch signals cannot affect the loading of the touch signals, so that the touch electrode is fully charged. Therefore, the above-mentioned touch panel provided by the embodiment of the present disclosure can not only solve the problem of the limited number of the pads in the existing large-size high-resolution touch screen product, but also solve the problem of incomplete charging of the touch electrodes in the charging process.

Obviously, those skilled in the art can make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to include these modifications and variations.

What is claimed is:

1. A touch panel, comprising:
   a touch area, comprising a plurality of touch signal lines; and
   a non-touch area surrounding the touch area; wherein the non-touch area comprises:
      a touch signal multiplexer, comprising a plurality of selection circuits, wherein each of the selection circuits comprises an input and at least two outputs, and the at least two outputs are electrically connected with the respective touch signal lines in one-to-one correspondence;
      a compensator, comprising a plurality of load compensation circuits in one-to-one correspondence with the selection circuits, wherein each of the load compensation circuits and its corresponding selection circuit are electrically connected with same touch signal lines; and
      a plurality of pads, electrically connected with the respective inputs of the selection circuits in one-to-one correspondence; wherein
   during a touch time period,
      each of the selection circuits is configured to load touch signals to the respective touch signal lines electrically connected with the selection circuit based on time division through a pad electrically connected with the selection circuit; and
      a load compensation circuit, corresponding to the selection circuit, is configured to, while the selection circuit loads the touch signals to one of the touch signal lines, load compensation signals to other of the touch signal lines.

2. The touch panel according to claim 1, further comprising:
   at least two first control signal lines; wherein
   each of the selection circuits further comprises:
      first switching transistors in one-to-one correspondence with the touch signal lines; wherein gates of the first switching transistors are electrically connected with different first control signal lines, first terminals of the first switching transistors are electrically connected with corresponding touch signal lines in one-to-one correspondence, and second terminals of the first switching transistors are electrically connected with a same pad.

3. The touch panel according to claim 2, further comprising:
   at least two second control signal lines and a compensation signal line; wherein
   each of the load compensation circuits comprises:
      second switching transistors in one-to-one correspondence with the touch signal lines; wherein gates of the second switching transistors are electrically connected with different second control signal lines, first terminals of the second switching transistors are electrically connected with corresponding touch signal lines in one-to-one correspondence, and second terminals of the second switching transistors are electrically connected with the compensation signal line.

4. The touch panel according to claim 3, wherein
   for the first switching transistor and the second switching transistor electrically connected with a same touch signal line at a same time, the second switching transistor is turned off while the first switching transistor is turned on, and the second switching transistor is turned on while the first switching transistor is off.

5. The touch panel according to claim 3, wherein
   the second terminals of all the second switching transistors are electrically connected with a same compensation signal line.

6. The touch panel according to claim 1, wherein
   the compensator is between the touch signal multiplexer and the touch area.

7. The touch panel according to claim 1, further comprising:
   a plurality of touch electrodes, electrically connected with the touch signal lines in one-to-one correspondence; wherein each of the selection circuits is electrically connected with two touch signal lines, the load compensation circuit corresponding to the selection circuit is electrically connected with same two touch signal lines, and two touch electrodes correspondingly electrically connected with the two touch signal lines are in a same row or a same column.

8. The touch panel according to claim 1, further comprising:
   a plurality of touch electrodes, electrically connected with the touch signal lines in one-to-one correspondence;
   each of the selection circuits is electrically connected with three touch signal lines, the load compensation circuit corresponding to the selection circuit is electrically connected with same three touch signal lines, and three touch electrodes correspondingly electrically connected with the three touch signal lines are in a same row or a same column.

9. A display device, comprising a display panel and a touch panel being stacked, wherein the touch panel is the touch panel according to claim 1.

10. The display device according to claim 9, wherein a display area of the display panel comprises a plurality of common electrode blocks, and the common electrode blocks are multiplexed as touch electrodes of the touch panel.

11. The display device according to claim 9, wherein a non-display area of the display panel comprises a first driving chip and a second driving chip, one half of the serially arranged pads in all the pads are electrically connected with the first driving chip, and the other half of the serially arranged pads in all the pads are electrically connected with the second driving chip.

12. A driving method of the touch panel according to claim 1, comprising:
   loading, by the selection circuit, the touch signals to the touch signal lines through the pad based on the time division during the touch time period; and
   loading, by the load compensation circuit, while the selection circuit loads the touch signals to one of the touch signal lines, the compensation signals to other of the touch signal lines.

13. The driving method of the touch panel according to claim 12, further comprising:
   loading, by the selection circuit, the touch signals to a first touch signal line of the touch signal lines through the pad in a first time period;
   loading, by the load compensation circuit, the compensation signals to a second touch signal line of the touch signal lines through the compensation signal line in the first time period;
   loading, by the selection circuit, the touch signals to the second touch signal line through the pad in a second time period; and
   loading, by the load compensation circuit, the compensation signals to the first touch signal line through the compensation signal line in the second time period; wherein
   the touch time period is divided into the first time period and the second time period.

14. The driving method of the touch panel according to claim 12, further comprising:
   loading, by the selection circuit, the touch signals to a first touch signal line of the touch signal lines through the pad in a first time period;
   loading, by the load compensation circuit, the compensation signals to a second touch signal line and a third touch signal line of the touch signal lines through the compensation signal line in the first time period;
   loading, by the selection circuit, the touch signals to the second touch signal line through the pad in a second time period;
   loading, by the load compensation circuit, the compensation signals to the first touch signal line and the third touch signal line through the compensation signal line in the second time period;
   loading, by the selection circuit, the touch signals to the third touch signal line through the pad in a third time period; and
   loading, by the load compensation circuit, the compensation signals to the first touch signal line and the second touch signal line through the compensation signal line in the third time period; wherein
   the touch time period is divided into the first time period, the second time period and the third time period.

* * * * *